United States Patent
Togou et al.

(10) Patent No.: US 11,342,118 B2
(45) Date of Patent: May 24, 2022

(54) MULTILAYER CERAMIC CAPACITOR AND METHOD OF MANUFACTURING MULTILAYER CERAMIC CAPACITOR

(71) Applicant: Murata Manufacturing Co., Ltd., Nagaokakyo (JP)

(72) Inventors: Kenichi Togou, Nagaokakyo (JP); Shinsuke Uchida, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 91 days.

(21) Appl. No.: 16/679,410

(22) Filed: Nov. 11, 2019

(65) Prior Publication Data
US 2020/0152386 A1 May 14, 2020

(30) Foreign Application Priority Data
Nov. 13, 2018 (JP) .............................. JP2018-213009

(51) Int. Cl.
*H01G 4/232* (2006.01)
*H01G 4/012* (2006.01)
(Continued)

(52) U.S. Cl.
CPC .............. *H01G 4/232* (2013.01); *H01G 4/012* (2013.01); *H01G 4/1227* (2013.01);
(Continued)

(58) Field of Classification Search
CPC .......... H01G 4/30; H01G 4/008; H01G 4/012; H01G 4/224; H01G 4/228; H01G 4/40;
(Continued)

(56) References Cited

U.S. PATENT DOCUMENTS

2009/0086403 A1    4/2009  Lee et al.
2009/0086406 A1*   4/2009  Lee ..................... H01G 4/228
                                                    361/306.3
(Continued)

FOREIGN PATENT DOCUMENTS

CN    106409503 A    2/2017
JP    2006-100708 A  4/2006
(Continued)

OTHER PUBLICATIONS

Official Communication issued in corresponding Korean Patent Application No. 10-2019-0137289, dated Jan. 26, 2021.
(Continued)

*Primary Examiner* — Michael P McFadden
(74) *Attorney, Agent, or Firm* — Keating & Bennett, LLP

(57) ABSTRACT

A multilayer ceramic capacitor includes a laminated body including a plurality of dielectric layers and a plurality of internal electrodes that are alternately laminated, and a first external electrode and a second external electrode provided on the surface of the laminated body. The first external electrode is provided on a first end surface of the laminated body, and extends from the first end surface of the laminated body to form a portion of the first side surface and a portion of the second side surface. The plurality of internal electrodes includes a first internal electrode and a second internal electrode. The first internal electrode is exposed at the first side surface and the second side surface of the laminated body and electrically connected to the first external electrode, and is not exposed at the first end surface of the laminated body.

15 Claims, 13 Drawing Sheets

(51) Int. Cl.
*H01G 13/00* (2013.01)
*H01G 4/12* (2006.01)
*H01G 4/224* (2006.01)
*H01G 4/33* (2006.01)

(52) U.S. Cl.
CPC .............. *H01G 4/224* (2013.01); *H01G 4/33* (2013.01); *H01G 13/00* (2013.01)

(58) Field of Classification Search
CPC ........ H01G 4/1227; H01G 4/232; H01G 4/33; H01G 13/00
See application file for complete search history.

(56) References Cited

U.S. PATENT DOCUMENTS

| | | | | |
|---|---|---|---|---|
| 2009/0225492 | A1* | 9/2009 | Lee | H01G 4/012 361/303 |
| 2009/0316330 | A1* | 12/2009 | Taniguchi | H01G 4/232 361/306.3 |
| 2013/0058006 | A1 | 3/2013 | Kim | |
| 2013/0250476 | A1 | 9/2013 | Chung et al. | |
| 2013/0286535 | A1* | 10/2013 | Chung | H01G 4/30 361/301.4 |
| 2015/0325372 | A1* | 11/2015 | Lee | H05K 1/181 174/260 |
| 2016/0049252 | A1 | 2/2016 | Park et al. | |
| 2017/0032897 | A1* | 2/2017 | Sasaki | H01G 4/0085 |
| 2019/0385793 | A1 | 12/2019 | Wakashima | |

FOREIGN PATENT DOCUMENTS

| | | |
|---|---|---|
| JP | 2011-181976 A | 9/2011 |
| JP | 2013-201417 A | 10/2013 |
| JP | 2016-127262 A | 7/2016 |
| JP | 2017-028240 A | 2/2017 |
| KR | 10-2014-0143340 A | 12/2014 |
| WO | 2018/159838 A1 | 9/2018 |

OTHER PUBLICATIONS

Official Communication issued in corresponding Japanese Patent Application No. 2018-213009, dated Mar. 23, 2021.
Official Communication issued in corresponding Chinese Patent Application No. 201911109498.4, dated Mar. 22, 2021.

* cited by examiner

MULTILAYER CERAMIC CAPACITOR AND METHOD OF MANUFACTURING MULTILAYER CERAMIC CAPACITOR

CROSS REFERENCE TO RELATED APPLICATIONS

This application claims the benefit of priority to Japanese Patent Application No. 2018-213009 filed on Nov. 13, 2018. The entire contents of this application are hereby incorporated herein by reference.

BACKGROUND OF THE INVENTION

1. Field of the Invention

The present invention relates to a multilayer ceramic capacitor and a method of manufacturing the multilayer ceramic capacitor.

2. Description of the Related Art

A multilayer ceramic capacitor generally includes a laminated body including a plurality of dielectric layers and a plurality of internal electrodes alternately laminated, and an external electrode provided on the surface of the laminated body.

As an example of a conventional multilayer ceramic capacitor, Japanese Patent Application Laid-Open No. 2013-201417 discloses an electronic component including a ceramic body, a first external electrode formed on one of a first pair of surfaces of the ceramic body and a second external electrode formed on the other of the first pair of surfaces, a third external electrode formed on one of a second pair of surfaces of the ceramic body and a fourth external electrode formed on the other of the second pair of surfaces, a first internal electrode formed inside the ceramic body and electrically connected to the first external electrode and the second external electrode, and a second internal electrode located between the first internal electrode and a ceramic layer and electrically connected to the third external electrode and the fourth external electrode.

FIG. 17A is a plan view showing an example of a first internal electrode of a conventional multilayer ceramic capacitor, FIG. 17B is a plan view showing an example of a second internal electrode of the conventional multilayer ceramic capacitor, and FIG. 17C is a perspective view of the multilayer ceramic capacitor, as viewed from the lamination direction in which the first internal electrode shown in FIG. 17A and the second internal electrode shown in FIG. 17B are laminated.

As shown in FIG. 17A, the first internal electrode 116 is exposed at the first end surface 12c and a second end surface 12d of the laminated body. On the other hand, the first internal electrode 116 is not exposed at a first side surface 12e and a second side surface 12f of the laminated body.

As shown in FIG. 17B, the second internal electrode 118 is exposed at the first side surface 12e and the second side surface 12f of the laminated body. On the other hand, the second internal electrode 118 is not exposed at a first end surface 12c and the second end surface 12d of the laminated body.

As shown in FIG. 17C, in the multilayer ceramic capacitor in which the first internal electrode 116 and the second internal electrode 118 are laminated, the first internal electrode 116 is electrically connected to a first end surface external electrode 20 at the first end surface 12c, and is electrically connected to a second end surface external electrode 22 at the second end surface 12d. The second internal electrode 118 is electrically connected to the first side surface external electrode 24 at the first side surface 12e, and electrically connected to the second side surface external electrode 26 at the second side surface 12f.

In recent years, along with the miniaturization and high performance of electronic components, miniaturization and high capacitance of multilayer ceramic capacitors are also required. It is conceivable to make the external electrode on the end surface thinner as a method of implementing the miniaturization and high capacitance of the multilayer ceramic capacitor. However, since the external electrode is required to have a function of suppressing the entry of moisture into the laminated body, the structure of the conventional multilayer ceramic capacitor is required to have a certain thickness or more of the external electrode.

SUMMARY OF THE INVENTION

Preferred embodiments of the present invention provide multilayer ceramic capacitors that are each able to provide a high capacitance by thinning an external electrode on the end surface side and that are each able to significantly reduce or prevent the entry of moisture into the laminated body even when the external electrode on the end surface side is thinned. Preferred embodiments of the present invention also provide methods of manufacturing the above-mentioned multilayer ceramic capacitors.

A multilayer ceramic capacitor according to a preferred embodiment of the present invention includes a laminated body including a plurality of dielectric layers and a plurality of internal electrodes that are alternately laminated, the laminated body including a first main surface and a second main surface facing each other in a lamination direction, a first end surface and a second end surface facing each other in a length direction orthogonal or substantially orthogonal to the lamination direction, and a first side surface and a second side surface facing each other in a width direction orthogonal or substantially orthogonal to the lamination direction and the length direction, and a first external electrode and a second external electrode provided on a surface of the laminated body. The first external electrode is provided on the first end surface of the laminated body, and extends from the first end surface of the laminated body to cover a portion of the first side surface and a portion of the second side surface. The plurality of internal electrodes include a first internal electrode electrically connected to the first external electrode and a second internal electrode facing the first internal electrode in the lamination direction and electrically connected to the second external electrode. The first internal electrode is exposed at the first side surface and the second side surface of the laminated body and electrically connected to the first external electrode, and is not exposed at the first end surface of the laminated body.

A method of manufacturing a multilayer ceramic capacitor according to a preferred embodiment of the present invention includes producing a laminated sheet including a plurality of laminated ceramic green sheets and internal electrode patterns provided along a plurality of respective interfaces between the ceramic green sheets, by cutting the laminated sheet along a width direction orthogonal or substantially orthogonal to a lamination direction, of a first cut end surface and a second cut end surface that appear by the cutting along the width direction, exposing a first internal electrode at the first cut end surface, and by cutting the laminated sheet along a length direction orthogonal or substantially orthogonal to the lamination direction and the width direction, exposing the first internal electrode at a first cut side surface and a second cut side surface that appear by the cutting along the length direction. A second internal electrode is exposed at any of the second cut end surface, the first cut side surface, and the second cut side surface by the cutting the laminated sheet along the width direction and the cutting the laminated sheet along the length direction. The method of manufacturing the multilayer ceramic capacitor further includes forming a first insulation layer at the first cut end surface, forming a first external electrode over an exposed portion of the first internal electrode on the first cut side surface, a surface of the first insulation layer, and an exposed portion of the first internal electrode on the second cut side surface, and forming a second external electrode on a exposed portion of the second internal electrode.

According to the preferred embodiments of the present invention, multilayer ceramic capacitors are each able to provide high capacitance by thinning an external electrode on the end surface side and are each also able to significantly reduce or prevent the entry of moisture into the laminated body even when the external electrode on the end surface side is thinned.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, the multilayer ceramic capacitors and the methods of manufacturing the multilayer ceramic capacitors according to preferred embodiments of the present invention will be described in detail with reference to the accompanying drawings.

The present invention is not limited to the following configurations, but can be applied by appropriately changing the configurations within a range not changing the gist of the present invention. Note that a combination of two or more individual desirable configurations described below is also the present invention.

Each preferred embodiment shown below is an exemplification, and partial replacement or combination of the configurations shown in the different preferred embodiments is possible. In the second and subsequent preferred embodiments, descriptions of items common to the first preferred embodiment will be omitted, and only different points will be described. In particular, the same or similar advantageous operations and effects by the same or similar configuration will not be sequentially referred to in each preferred embodiment.

Multilayer Ceramic Capacitor

First Preferred Embodiment

A multilayer ceramic capacitor according to the first preferred embodiment of the present invention is a three-terminal multilayer ceramic capacitor, and includes a first external electrode, a second external electrode, a third external electrode, and a fourth external electrode on the surface of the laminated body.

Figure 1:
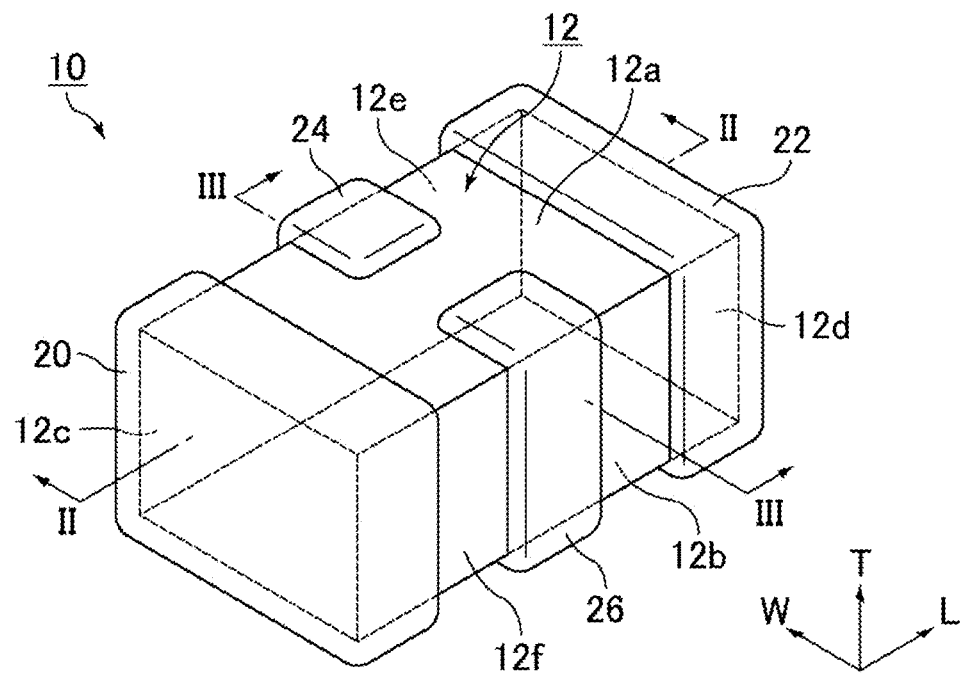
FIG. 1 is a perspective view showing an example of a multilayer ceramic capacitor according to a first preferred embodiment of the present invention.
Figure 2:
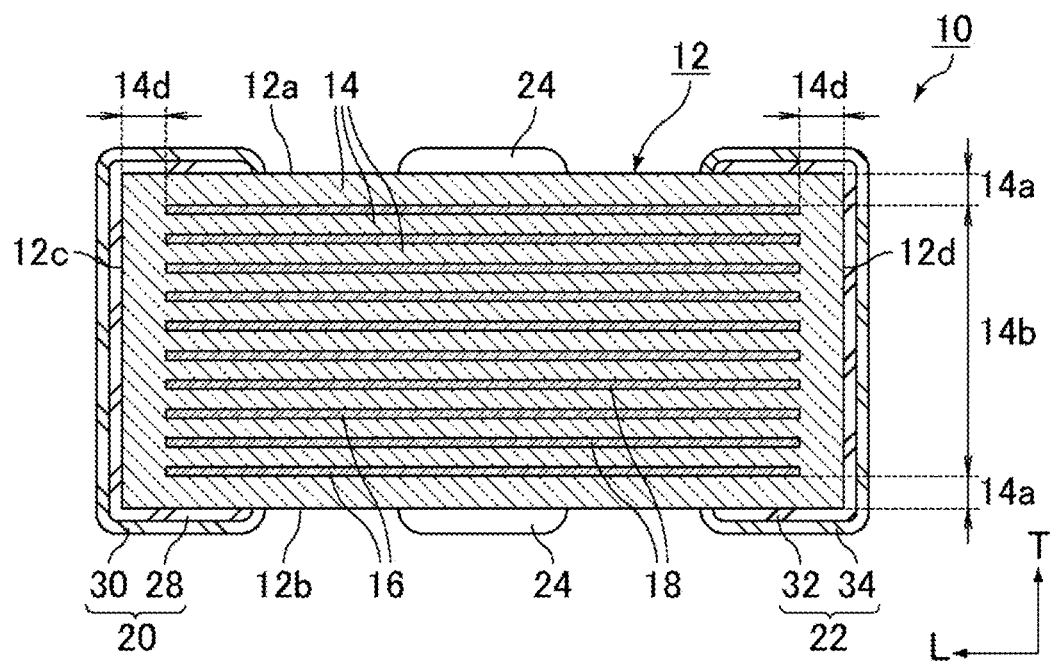
FIG. 2 is a cross-sectional view of the multilayer ceramic capacitor taken along line II-II of FIG. 1.
Figure 3:
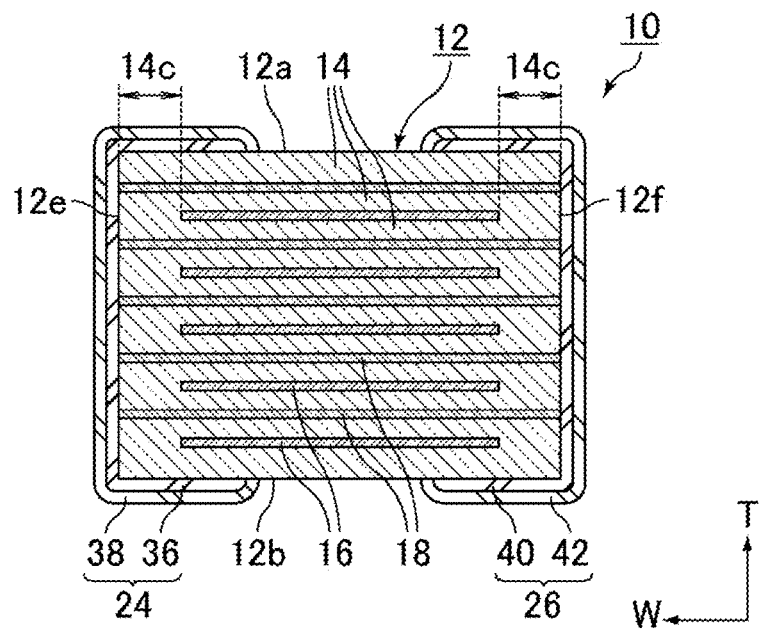
FIG. 3 is a cross-sectional view of the multilayer ceramic capacitor taken along line III-III of FIG. 1.

FIG. 1 is a perspective view showing an example of the multilayer ceramic capacitor according to the first preferred embodiment of the present invention. FIG. 2 is a cross-sectional view of the multilayer ceramic capacitor taken along line II-II of FIG. 1. FIG. 3 is a cross-sectional view of the multilayer ceramic capacitor taken along line III-III of FIG. 1.

In this specification, the lamination direction, the length direction, and the width direction of the multilayer ceramic capacitor and the laminated body are respectively defined by T, L, and W in FIG. 1. Here, the lamination direction (T direction), the length direction (L direction), and the width direction (W direction) are orthogonal or substantially orthogonal to each other. The lamination direction (T direction) is a direction in which a plurality of dielectric layers 14 and a plurality of internal electrodes 16 and 18 are laminated.

A multilayer ceramic capacitor 10 in FIGS. 1, 2, and 3 is a three-terminal multilayer ceramic capacitor. As shown in FIG. 1, FIG. 2 and FIG. 3, the multilayer ceramic capacitor 10 preferably includes, for example, a rectangular parallelepiped or a substantially rectangular parallelepiped laminated body 12.

The laminated body 12 includes the plurality of dielectric layers 14 and the plurality of internal electrodes 16 and 18 alternately laminated.

The laminated body 12 includes a first main surface 12a and a second main surface 12b facing each other in the lamination direction (T direction), a first end surface 12c and a second end surface 12d facing each other in the length direction (L direction) orthogonal or substantially orthogonal to the lamination direction (T direction), and a first side surface 12e and a second side surface 12f facing each other in the width direction (W direction) orthogonal or substantially orthogonal to the lamination direction (T direction) and the length direction (L direction).

In the present specification, a cross section of the multilayer ceramic capacitor 10 or the laminated body 12 orthogonal or substantially orthogonal to the first end surface 12c and the second end surface 12d, and parallel or substantially parallel to the lamination direction (T direction) is referred to as an LT cross section. Further, a cross section of the multilayer ceramic capacitor 10 or the laminated body 12 orthogonal or substantially orthogonal to the first side surface 12e and the second side surface 12f, and parallel or substantially parallel to the lamination direction (T direction) is referred to as a WT cross section. Further, a cross section of the multilayer ceramic capacitor 10 or the laminated body 12 orthogonal or substantially orthogonal to the first end surface 12c, the second end surface 12d, the first side surface 12e, and the second side surface 12f, and orthogonal or substantially orthogonal to the lamination direction (T direction) is referred to as an LW cross section. Therefore, FIG. 2 is the LT cross section of the multilayer ceramic capacitor 10, and FIG. 3 is the WT cross section of the multilayer ceramic capacitor 10.

The laminated body 12 preferably has rounded corner portions and ridgeline portions, for example. The corner portions are portions at which the three surfaces of the laminated body intersect, and the ridgeline portions are portions at which the two surfaces of the laminated body intersect.

In the multilayer ceramic capacitor 10 shown in FIG. 1, the dimension of the laminated body 12 in the length direction (L direction) is longer than the dimension of the laminated body 12 in the width direction (W direction). However, the dimension of the laminated body 12 in the length direction may be shorter than the dimension of the laminated body 12 in the width direction, or may be the same as or similar to the dimension in the width direction.

The dielectric layer 14 is made of a dielectric material. An example of the dielectric material includes a dielectric ceramic including a main component such as barium titanate, calcium titanate, strontium titanate, barium calcium titanate, or calcium zirconate. When the above dielectric material is included as a main component, depending on the desired characteristics of the multilayer ceramic capacitor 10, for example, the dielectric ceramic in which an auxiliary component such as an Mg compound, an Mn compound, an Si compound, an Al compound, a V compound, or an Ni compound is added, where the content of the auxiliary component is less than that of the main components, is used.

The average thickness of the dielectric layer 14 sandwiched by the internal electrodes is preferably about 0.1 μm or more and about 2 μm or less, and more preferably about 0.1 μm or more and about 1 μm or less, for example.

As shown in FIG. 2, the dielectric layer 14 includes an outer layer portion 14a and an inner layer portion 14b. The outer layer portion 14a is the dielectric layer 14 which is located on the first main surface 12a side of the laminated body 12 and located between the first main surface 12a and the internal electrode (the internal electrode 18 in FIG. 2) closest to the first main surface 12a, and is the dielectric layer 14 which located on the second main surface 12b side of the laminated body 12 and located between the second main surface 12b and the internal electrode (the internal electrode 16 in FIG. 2) closest to the second main surface 12b. The region located between both outer layer portions 14a is the inner layer portion 14b.

One of the thicknesses of the outer layer portions 14a is preferably about 1 μm to about 50 μm (inclusive), and more preferably about 1 μm to about 30 μm (inclusive) on one side, for example.

A first end surface external electrode 20, which is an example of the first external electrode, is disposed on the first end surface 12c of the laminated body 12. The first end surface external electrode 20 extends from the first end surface 12c of the laminated body 12 to cover a portion of the first main surface 12a, a portion of the second main surface 12b, a portion of the first side surface 12e, and a portion of the second side surface 12f. The first end surface external electrode 20 may not be disposed on the first main surface 12a or the second main surface 12b of the laminated body 12. Moreover, it is preferable that the first end surface external electrode 20 covers the entire or substantially the entire first end surface 12c of the laminated body 12, for example.

A second end surface external electrode 22, which is an example of a third external electrode, is disposed on the second end surface 12d of the laminated body 12. The second end surface external electrode 22 extends from the second end surface 12d of the laminated body 12 to cover a portion of the first main surface 12a, a portion of the second main surface 12b, a portion of the first side surface 12e, and a portion of the second side surface 12f. The second end surface external electrode 22 may not be disposed on the first main surface 12a or the second main surface 12b of the laminated body 12. Further, it is preferable that the second end surface external electrode 22 covers the entire or substantially the entire second end surface 12d of the laminated body 12, for example.

A first side surface external electrode 24, which is an example of a second external electrode, is disposed on the first side surface 12e of the laminated body 12. The first side surface external electrode 24 extends from the first side surface 12e to cover a portion of the first main surface 12a and a portion of the second main surface 12b. The first side surface external electrode 24 may be disposed only on the first side surface 12e.

A second side surface external electrode 26, which is an example of the fourth external electrode, is disposed on the second side surface 12f of the laminated body 12. The second side surface external electrode 26 extends from the second side surface 12f to cover a portion of the first main surface 12a and a portion of the second main surface 12b. The second side surface external electrode 26 may be disposed only on the second side surface 12f.

In addition, the first side surface external electrode 24 may extend from the first side surface 12e to the second side surface external electrode 26 and cover the first main surface 12a, and furthermore, the first side surface external electrode 24 may extend from the first side surface 12e to the second side surface external electrode 26 and cover the second main surface 12b, so that the first side surface external electrode 24 and the second side surface external electrode 26 may be connected. As a result of the connection, the first side surface external electrode 24 may wind around the laminated body 12.

As shown in FIG. 2, the first end surface external electrode 20 includes, sequentially from the laminated body 12 side, a base electrode layer 28 disposed on the surface of the laminated body 12 and a plating layer 30 that covers the base electrode layer 28. Similarly, the second end surface external electrode 22 includes, sequentially from the laminated body 12 side, a base electrode layer 32 disposed on the surface of the laminated body 12 and a plating layer 34 s covers the base electrode layer 32.

As shown in FIG. 3, the first side surface external electrode 24 includes, sequentially from the laminated body 12 side, a base electrode layer 36 disposed on the surface of the laminated body 12 and a plating layer 38 that covers the base electrode layer 36. Similarly, the second side surface external electrode 26 includes, sequentially from the laminated body 12 side, a base electrode layer 40 disposed on the surface of the laminated body 12 and a plating layer 42 that covers the base electrode layer 40.

The base electrode layer includes at least one selected from a baked electrode layer, a resin electrode layer, a thin film electrode layer, and the like.

The baked electrode layer includes metal and glass. As the metal of the baked electrode layer, for example, at least one selected from Cu, Ni, Ag, Pd, an Ag—Pd alloy, Au and the like can be used. As glass of a baked electrode layer, glass including B, Si, Ba, Mg, Al or Li etc. can be used, for example.

The baked electrode layer may include a plurality of layers.

The baked electrode layer is provided by applying a conductive paste including metal and glass to the laminated body and baking it. The baked electrode layer may be co-fired with the laminated body, or may be baked after firing the laminated body. When co-firing with the laminated body to form a baked electrode layer, the baked electrode layer preferably includes metal and ceramic, for example. More preferably, the ceramic is a common material, for example.

When the base electrode layer of the end surface external electrode is the baked electrode layer, the thickness of the baked electrode layer in the length direction (L direction) is preferably about 0.5 μm to about 50 μm (inclusive) at the thickest portion, for example.

When the base electrode layer of the end surface external electrode is the baked electrode layer, the thickness of the baked electrode layer, in the width direction (W direction), that goes around the side surface of the laminated body is preferably about 0.5 μm to about 10 μm (inclusive) at the thickest portion, for example.

When the base electrode layer of the side surface external electrode is the baked electrode layer, the thickness of the baked electrode layer in the width direction (W direction) is preferably about 0.5 μm to about 50 μm (inclusive) at the thickest portion, for example.

The thin film electrode layer is an atomic layer in which atoms are deposited and which is formed by a thin film forming method, for example, plating, sputtering or vapor deposition.

As a material of the plating layer, for example, at least one selected from Cu, Ni, Ag, Pd, an Ag—Pd alloy, Au, Sn and the like is used.

The plating layer may include a plurality of layers. The plating layer is preferably a two-layer structure of a Ni plating layer and a Sn plating layer, for example. The Ni plating layer is able to significantly reduce or prevent erosion of the base electrode layer by the solder when the multilayer ceramic capacitor is mounted. The Sn plating layer is able to significantly improve wettability of the solder when the multilayer ceramic capacitor is mounted, and can facilitate the mounting of the multilayer ceramic capacitor.

The average thickness of the Ni plating layer is preferably about 1 μm to about 10 μm (inclusive), for example. The average thickness of the Sn plating layer is preferably about 1 μm to about 10 μm (inclusive), for example.

As shown in FIGS. 2 and 3, the laminated body 12 includes a plurality of first internal electrodes 16 and a plurality of second internal electrodes 18. The first internal electrodes 16 and the second internal electrodes 18 are embedded and alternately disposed at equal or substantially equal intervals along the lamination direction (the T direction) of the laminated body 12.

Figure 4A:
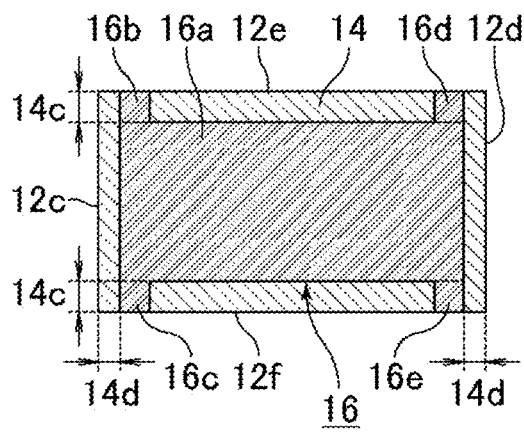
FIG. 4A is a plan view showing an example of a first internal electrode of the multilayer ceramic capacitor according to the first preferred embodiment of the present invention.
Figure 4B:
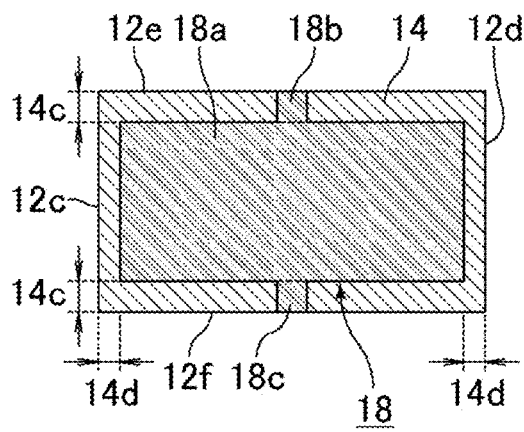
FIG. 4B is a plan view showing an example of a second internal electrode of the multilayer ceramic capacitor according to the first preferred embodiment of the present invention.
Figure 4C:
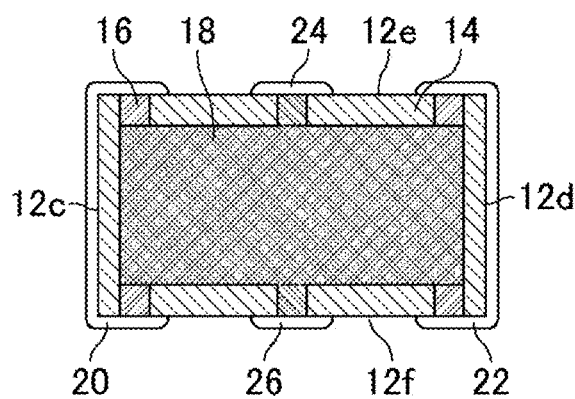
FIG. 4C is a perspective view of the multilayer ceramic capacitor, as viewed from the lamination direction in which the first internal electrode shown in FIG. 4A and the second internal electrode shown in FIG. 4B are laminated.

FIG. 4A is a plan view showing an example of the first internal electrode of the multilayer ceramic capacitor according to the first preferred embodiment of the present invention. FIG. 4B is a plan view showing an example of the second internal electrode of the multilayer ceramic capacitor according to the first preferred embodiment of the present invention. FIG. 4C is a perspective view of the multilayer ceramic capacitor, as viewed from the lamination direction in which the first internal electrode shown in FIG. 4A and the second internal electrode shown in FIG. 4B are laminated.

As shown in FIG. 4A, the first internal electrode 16 includes a first counter electrode portion 16a that faces the second internal electrode 18, a first extended electrode portion 16b extended from the first counter electrode portion 16a to the first side surface 12e of the laminated body 12, a second extended electrode portion 16c extended from the first counter electrode portion 16a to the second side surface 12f of the laminated body 12, a third extended electrode portion 16d extended from the first counter electrode portion 16a to the first side surface 12e of the laminated body 12, and a fourth extended electrode portion 16e extended from the first counter electrode portion 16a to the second side surface 12f of the laminated body 12.

As shown in FIG. 4C, the first extended electrode portion 16b is exposed at the first side surface 12e of the laminated body 12 and electrically connected to the first end surface external electrode 20, the second extended electrode portion 16c is exposed at the second side surface 12f of the laminated body 12 and electrically connected to the first end surface external electrode 20, the third extended electrode portion 16d is exposed at the first side surface 12e of the laminated body 12 and electrically connected to the second end surface external electrode 22, and the fourth extended electrode portion 16e is exposed at the second side surface 12f of the laminated body 12 and electrically connected to the second end surface external electrode 22.

Thus, the first internal electrode 16 is exposed at the first side surface 12e and the second side surface 12f of the laminated body 12 and electrically connected to the first end surface external electrode 20, and is not exposed at the first end surface 12c of the laminated body 12. Further, the first internal electrode 16 is exposed at the first side surface 12e and the second side surface 12f of the laminated body 12 and electrically connected to the second end surface external electrode 22, and is not exposed at the second end surface 12d of the laminated body 12.

Unlike conventional multilayer ceramic capacitors, the first internal electrode 16 is not exposed at the first end surface 12c of the laminated body 12, but is exposed at the first side surface 12e and the second side surface 12f of the laminated body 12, and thus the need to consider the entry of moisture from the first end surface 12c side is reduced. Therefore, since the first end surface external electrode 20 can be thinned, the capacitance can be increased. Furthermore, the first internal electrode 16 is not exposed at the second end surface 12d of the laminated body 12, but is exposed at the first side surface 12e and the second side surface 12f of the laminated body 12, and thus the second end surface external electrode 22 can also be made thinner, so that the capacitance can be further increased.

As shown in FIG. 4B, the second internal electrode 18 is substantially cross-shaped, and includes a second counter electrode portion 18a facing the first internal electrode 16, a fifth extended electrode portion 18b extended from the second counter electrode portion 18a to the first side surface 12e of the laminated body 12, and a sixth extended electrode portion 18c extended from the second counter electrode portion 18a to the second side surface 12f of the laminated body 12.

As shown in FIG. 4C, the fifth extended electrode portion 18b is exposed at the first side surface 12e of the laminated body 12 and electrically connected to the first side surface external electrode 24, and the sixth extended electrode portion 18c is exposed at the second side surface 12f of the laminated body 12 and electrically connected to the second side surface external electrode 26.

In this way, the second internal electrode 18 is not exposed at the first end surface 12c or the second end surface 12d of the laminated body 12, but is exposed at the first side surface 12e of the laminated body 12 and electrically connected to the first side surface external electrode 24, and is exposed at the second side surface 12f of the laminated body 12 and electrically connected to the second side surface external electrode 26.

The first internal electrode 16 and the second internal electrode 18 face each other with the dielectric layer 14 including a dielectric ceramic material located therebetween to define a capacitor. Thus, the multilayer ceramic capacitor 10 defines and functions as a capacitor.

These internal electrodes can include an appropriate conductive material. The internal electrode preferably includes, for example, a metal such as Ni, Cu, Ag, Pd, or Au, or an alloy such as an Ag—Pd alloy including one of these metals. The internal electrode may further include dielectric grains of the same or similar composition as the ceramic included in the dielectric layer 14.

The total number of laminated internal electrodes is preferably about 10 or more and about 2000 or less, for example.

The average thickness of the internal electrode is preferably about 0.1 μm or more and about 2 μm or less, for example.

As shown in FIG. 4C, it is preferable that the end portion of the second internal electrode 18 on the first end surface 12c side be disposed at a position at which it overlaps the end portion of the first internal electrode 16 on the first end surface 12c side when viewed from the lamination direction (direction T), for example.

In this case, since the area of the second internal electrode 18 can be increased, a high capacitance can be obtained.

Similarly, the end portion of the second internal electrode 18 on the second end surface 12d side is preferably disposed at a position where it overlaps the end portion of the first internal electrode 16 on the second end surface 12d side when viewed from the lamination direction (direction T), for example.

Thus, it is preferable that the length of the first internal electrode 16 and the length of the second internal electrode 18 in the length direction (L direction) are equal or substantially equal, for example.

As shown in FIG. 3 and FIGS. 4A and 4B, the laminated body 12 includes a side portion (hereinafter also referred to as "W gap") 14c of the laminated body 12 provided between one end of the first counter electrode portion 16a and the second counter electrode portion 18a in the width direction (W direction), and the first side surface 12e, and between the other end of the first counter electrode portion 16a and the second counter electrode portion 18a in the width direction (W direction), and the second side surface 12f. Furthermore, as shown in FIG. 2, and FIGS. 4A and 4B, the laminated body 12 includes an end portion (hereinafter also referred to as "L gap") 14d of the laminated body 12 provided between one end of the first counter electrode portion 16a and the second counter electrode portion 18a in the length direction (L direction), and the first end surface 12c, and the other end of the first counter electrode portion 16a and the second counter electrode portion 18a in the length direction (L direction), and the second end surface 12d.

The average length of the W gap 14c in the width direction (W direction) is preferably about 20 μm or more and about 100 μm or less, more preferably about 30 μm or more and about 70 μm or less, and still more preferably about 40 μm or more and about 50 μm or less, for example.

The average length of the L gap 14d in the length direction (L direction) is preferably about 5 μm to about 50 μm (inclusive), more preferably about 10 μm to about 30 μm (inclusive), and still more preferably about 15 μm to about 20 μm (inclusive), for example.

Figure 5A:
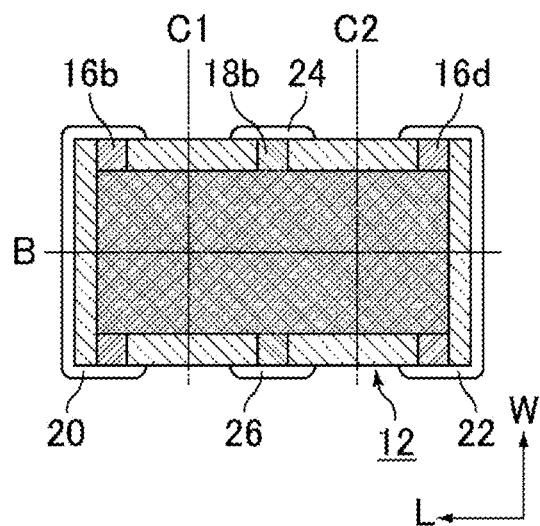
FIGS. 5A to 5C are diagrams showing a method of measuring an L gap and a W gap.
Figure 5B:
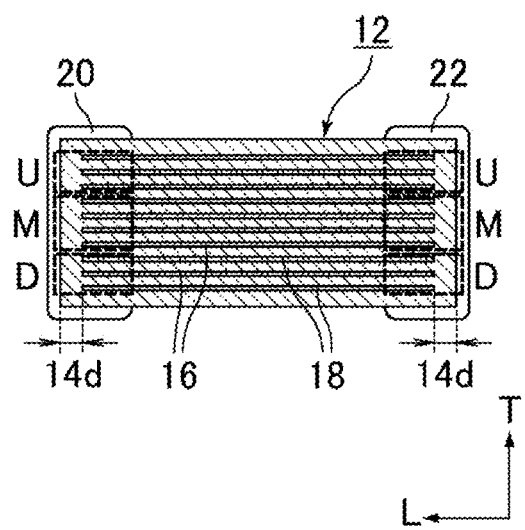
Figure 5C:
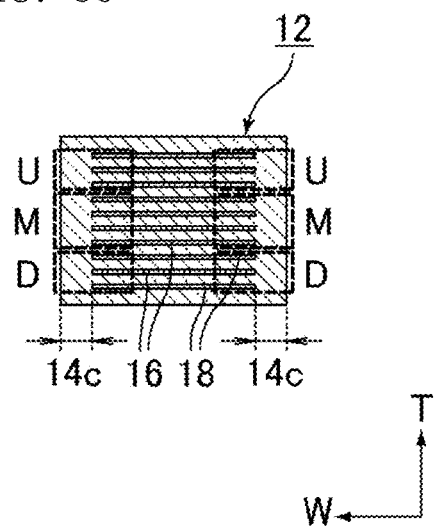

FIGS. 5A to 5C are diagrams showing the method of measuring the L gap and the W gap.

Method of Measuring L Gap

As shown in FIG. 5A, in the cross section B of the laminated body 12 at a position of ½ of the length of the width direction (W direction), a region in which the first internal electrodes 16 and the second internal electrodes 18 are laminated is divided into an upper portion U, a middle portion M, and a lower portion D as shown in FIG. 5B. The length of the L gap 14d is measured in one location in the upper portion U, one location in the middle portion M, and one location in the lower portion D. Since the L gaps 14d are present on the left and right, a total of six locations are measured. The measurement is performed on five laminated bodies 12 to obtain the average value of values measured at a total of 30 locations.

Measurement Method of W Gap

As shown in FIG. 5A, in a cross-section C1 at a position of the central portion between the first extended electrode portion 16b and the fifth extended electrode portion 18b in the length direction (L direction) of the laminated body 12 in the length direction (L direction), and in a cross-section C2 at a position of the central portion between the third extended electrode portion 16d and the fifth extended electrode portion 18b in the length direction (L direction) of the laminated body 12 in the length direction (L direction), a region where the first internal electrodes 16 and the second internal electrodes 18 are laminated is divided into the upper portion U, the middle portion M, and the lower portion D as shown in FIG. 5C. The length of the W gap 14c is measured in one location in the upper portion U, one location in the middle portion M, and one location in the lower portion D. Since the W gap 14c is present on the left and right, a total of 12 locations are measured. The measurement is performed on the three laminated bodies 12 to obtain the average value of values measured at a total of 36 locations.

Second Preferred Embodiment

In the multilayer ceramic capacitor according to the second preferred embodiment of the present invention, the first internal electrode includes the first A internal electrode and the first B internal electrode.

Figure 6A:
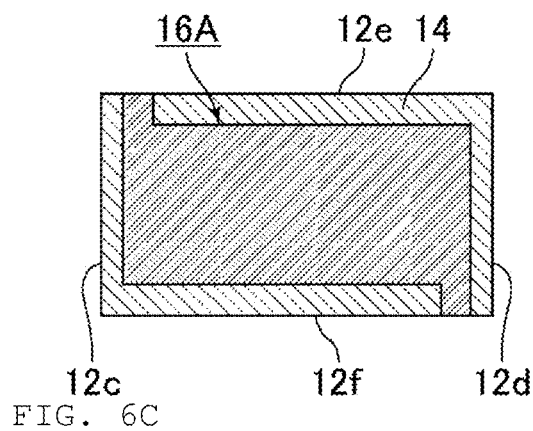
FIG. 6A is a plan view showing an example of a first A internal electrode of a multilayer ceramic capacitor according to a second preferred embodiment of the present invention.
Figure 6B:
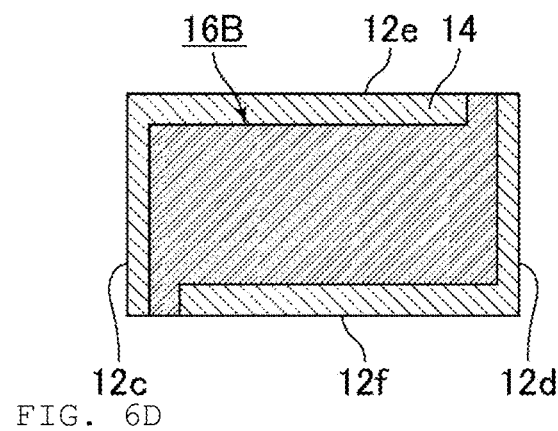
FIG. 6B is a plan view showing an example of a first B internal electrode of the multilayer ceramic capacitor according to the second preferred embodiment of the present invention.
Figure 6C:
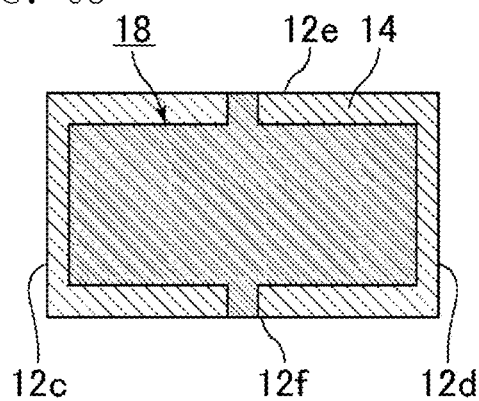
FIG. 6C is a plan view showing an example of a second internal electrode of the multilayer ceramic capacitor according to the second preferred embodiment of the present invention.
Figure 6D:
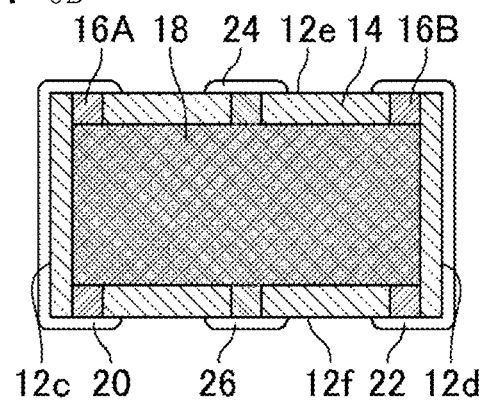
FIG. 6D is a perspective view of the multilayer ceramic capacitor, as viewed from the lamination direction in which the first A internal electrode shown in FIG. 6A, the first B internal electrode shown in FIG. 6B, and the second internal electrode shown in FIG. 6C are laminated.

FIG. 6A is a plan view showing an example of the first A internal electrode defining the multilayer ceramic capacitor according to the second preferred embodiment of the present invention, FIG. 6B is a plan view showing an example of the first B internal electrode of the multilayer ceramic capacitor according to the second preferred embodiment of the present invention, FIG. 6C is a plan view showing an example of a second internal electrode of the multilayer ceramic capacitor according to the second preferred embodiment of the present invention, and FIG. 6D is a perspective view of the multilayer ceramic capacitor, as viewed from the lamination direction in which the first A internal electrode shown in FIG. 6A, the first B internal electrode shown in FIG. 6B, and the second internal electrode shown in FIG. 6C are laminated.

As shown in FIGS. 6A and 6D, a first A internal electrode 16A is exposed at the first side surface 12e of the laminated body 12 and electrically connected to the first end surface external electrode 20, and is not exposed at the first end surface 12c of the laminated body 12. Further, the first A internal electrode 16A is exposed at the second side surface 12f of the laminated body 12 and electrically connected to the second end surface external electrode 22, and is not exposed at the second end surface 12d of the laminated body 12.

As shown in FIGS. 6B and 6D, a first B internal electrode 16B is exposed at the second side surface 12f of the laminated body 12 and electrically connected to the first end surface external electrode 20, and is not exposed at the first end surface 12c of the laminated body 12. Further, the first B internal electrode 16B is exposed at the first side surface 12e of the laminated body 12 and electrically connected to the second end surface external electrode 22, and is not exposed at the second end surface 12d of the laminated body 12.

As shown in FIGS. 6C and 6D, the second internal electrode 18 is not exposed at the first end surface 12c or the second end surface 12d of the laminated body 12, but is exposed at the first side surface 12e of the laminated body 12 and electrically connected to the first side surface external electrode 24, and is exposed at the second side surface 12f of the laminated body 12 and electrically connected to the second side surface external electrode 26.

Any one of the first A internal electrode 16A and the first B internal electrode 16B, and the second internal electrode 18 face each other with the dielectric layer 14 located therebetween to define a capacitor.

Third Preferred Embodiment

In the multilayer ceramic capacitor according to the second preferred embodiment of the present invention, the first internal electrode includes the first A internal electrode, the first B internal electrode, the first C internal electrode and the first D internal electrode, and the second internal electrode includes the second A internal electrode and the second B internal electrode.

Figure 7A:
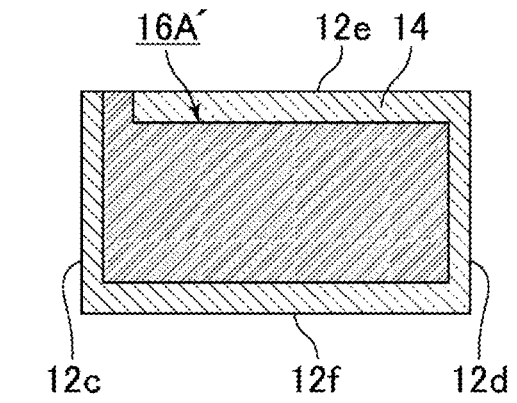
FIG. 7A is a plan view showing an example of a first A internal electrode of a multilayer ceramic capacitor according to a third preferred embodiment of the present invention.
Figure 7B:
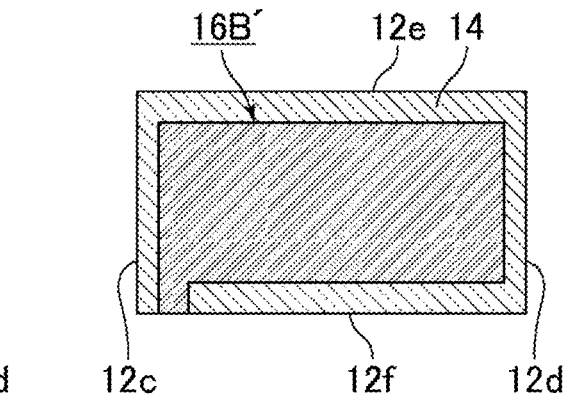
FIG. 7B is a plan view showing an example of a first B internal electrode of the multilayer ceramic capacitor according to the third preferred embodiment of the present invention.
Figure 7C:
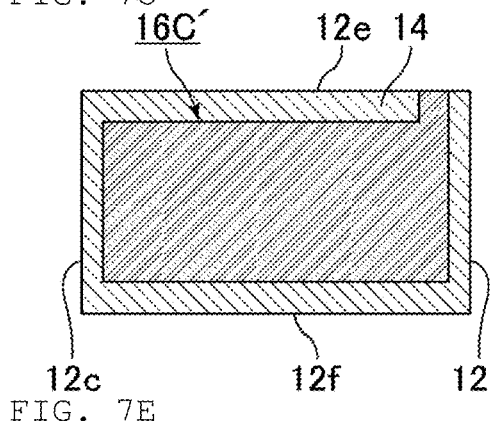
FIG. 7C is a plan view showing an example of a first C internal electrode of the multilayer ceramic capacitor according to the third preferred embodiment of the present invention.
Figure 7D:
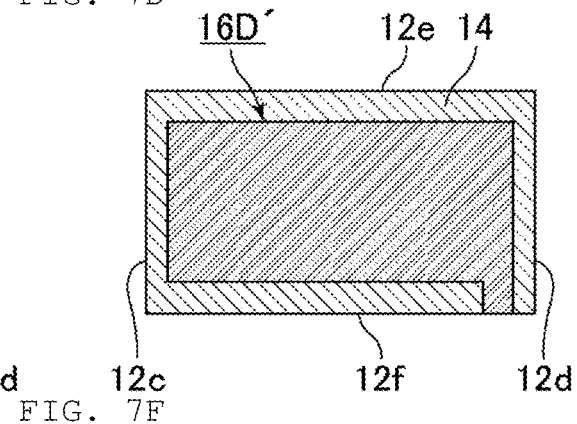
FIG. 7D is a plan view showing an example of a first D internal electrode of the multilayer ceramic capacitor according to the third preferred embodiment of the present invention.
Figure 7E:
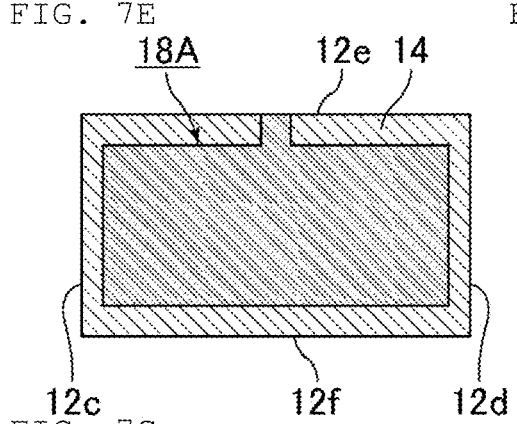
FIG. 7E is a plan view showing an example of a second A internal electrode of the multilayer ceramic capacitor according to the third preferred embodiment of the present invention.
Figure 7F:
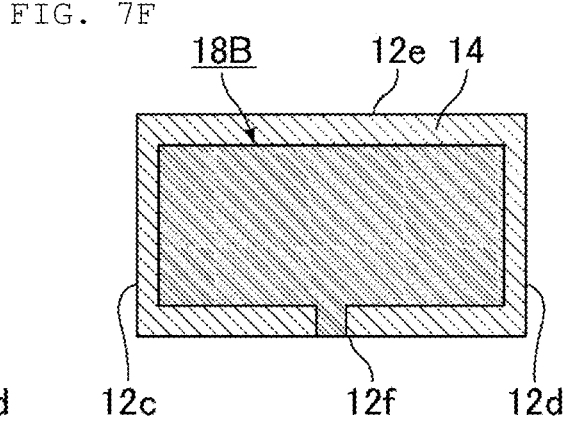
FIG. 7F is a plan view showing an example of a second B internal electrode of the multilayer ceramic capacitor according to the third preferred embodiment of the present invention.
Figure 7G:
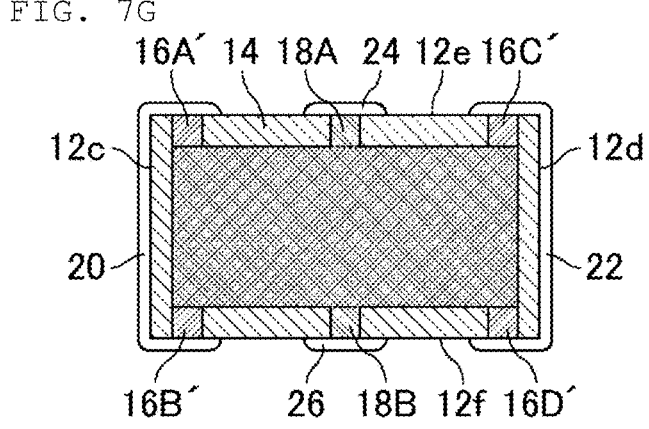
FIG. 7G is a perspective view of the multilayer ceramic capacitor, as viewed from the lamination direction in which the first A internal electrode shown in FIG. 7A, the first B internal electrode shown in FIG. 7B, the first C internal electrode shown in FIG. 7C, the first D internal electrode shown in FIG. 7D, the second A internal electrode shown in FIG. 7E, and the second B internal electrode shown in FIG. 7F are laminated.

FIG. 7A is a plan view showing an example of the first A internal electrode of a multilayer ceramic capacitor according to a third preferred embodiment of the present invention, FIG. 7B is a plan view showing an example of the first B internal electrode of the multilayer ceramic capacitor according to the third preferred embodiment of the present invention, FIG. 7C is a plan view showing an example of the first C internal electrode defining the multilayer ceramic capacitor according to the third preferred embodiment of the present invention, FIG. 7D is a plan view showing an example of the first D internal electrode of the multilayer ceramic capacitor according to the third preferred embodiment of the present invention, FIG. 7E is a plan view showing an example of the second A internal electrode of the multilayer ceramic capacitor according to the third preferred embodiment of the present invention, FIG. 7F is a plan view showing an example of the second B internal electrode of the multilayer ceramic capacitor according to the third preferred embodiment of the present invention, and FIG. 7G is a perspective view of the multilayer ceramic capacitor, as viewed from the lamination direction in which the first A internal electrode shown in FIG. 7A, the first B internal electrode shown in FIG. 7B, the first C internal electrode shown in FIG. 7C, the first D internal electrode shown in FIG. 7D, the second A internal electrode shown in FIG. 7E, and the second B internal electrode shown in FIG. 7F are laminated.

As shown in FIGS. 7A and 7G, a first A internal electrode 16A' is exposed at the first side surface 12e of the laminated body 12 and electrically connected to the first end surface external electrode 20, and is not exposed at the first end surface 12c of the laminated body 12.

As shown in FIGS. 7B and 7G, a first B internal electrode 16B' is exposed at the second side surface 12f of the laminated body 12 and electrically connected to the first end surface external electrode 20, and is not exposed at the first end surface 12c of the laminated body 12.

As shown in FIGS. 7C and 7G, a first C internal electrode 16C' is exposed at the first side surface 12e of the laminated body 12 and electrically connected to the second end surface external electrode 22, and is not exposed at the second end surface 12d of the laminated body 12.

As shown in FIGS. 7D and 7G, a first D internal electrode 16D' is exposed at the second side surface 12f of the laminated body 12 and electrically connected to the second end surface external electrode 22, and is not exposed at the second end surface 12d of the laminated body 12.

As shown in FIGS. 7E and 7G, a second A internal electrode 18A is not exposed at the second side surface 12f, the first end surface 12c or the second end surface 12d of the laminated body 12, but is exposed at the first side surface 12e of the laminated body 12 and electrically connected to the first side surface external electrode 24.

As shown in FIGS. 7F and 7G, a second B internal electrode 18B is not exposed at the first side surface 12e, the first end surface 12c, or the second end surface 12d of the laminated body 12, but exposed at the second side surface 12f of the laminated body 12 and electrically connected to the second side surface external electrode 26.

Any one of the first A internal electrode 16A', the first B internal electrode 16B', the first C internal electrode 16C' and the first D internal electrode 16D', and any one of the second A internal electrode 18A and the second B internal electrode 18B face each other with the dielectric layer 14 located therebetween to define a capacitor.

Fourth Preferred Embodiment

A multilayer ceramic capacitor according to a fourth preferred embodiment of the present invention is a two-terminal multilayer ceramic capacitor, and includes the first external electrode and the second external electrode on the surface of the laminated body.

Figure 8A:
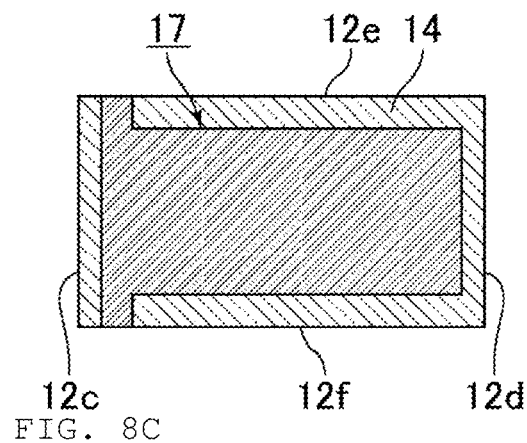
FIG. 8A is a plan view showing an example of a first internal electrode of the multilayer ceramic capacitor according to a fourth preferred embodiment of the present invention.
Figure 8B:
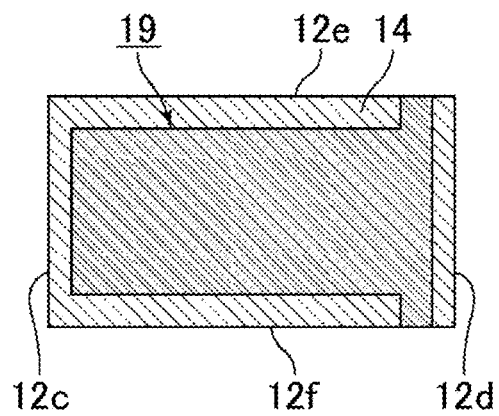
FIG. 8B is a plan view showing an example of a second internal electrode of the multilayer ceramic capacitor according to the fourth preferred embodiment of the present invention.
Figure 8C:
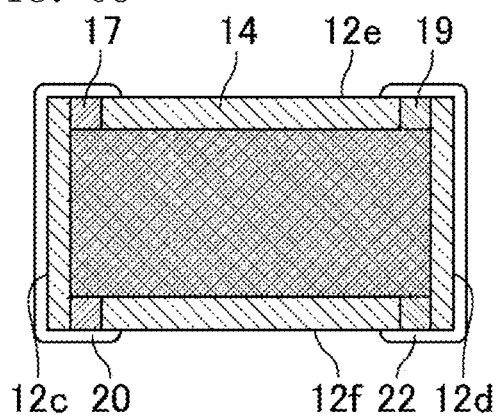
FIG. 8C is a perspective view of the multilayer ceramic capacitor, as viewed from the lamination direction in which the first internal electrode shown in FIG. 8A and the second internal electrode shown in FIG. 8B are laminated.

FIG. 8A is a plan view showing an example of the first internal electrode of the multilayer ceramic capacitor according to the fourth preferred embodiment of the present invention. FIG. 8B is a plan view showing an example of the second internal electrode of the multilayer ceramic capacitor according to the fourth preferred embodiment of the present invention. FIG. 8C is a perspective view of the multilayer ceramic capacitor, as viewed from the lamination direction in which the first internal electrode shown in FIG. 8A and the second internal electrode shown in FIG. 8B are laminated.

As shown in FIG. 8C, the first end surface external electrode 20, which is an example of the first external electrode, is disposed on the first end surface 12c of the laminated body 12. The first end surface external electrode 20 extends from the first end surface 12c of the laminated body 12 to cover a portion of the first side surface 12e and a portion of the second side surface 12f. The first end surface external electrode 20 may be disposed on the first main surface 12a and the second main surface 12b of the laminated body 12. Moreover, it is preferable that the first end surface external electrode 20 covers the entire first end surface 12c of the laminated body 12, for example.

As shown in FIG. 8C, the second end surface external electrode 22, which is an example of the second external electrode, is disposed on the second end surface 12d of the laminated body 12. The second end surface external electrode 22 extends from the second end surface 12d of the laminated body 12 to cover a portion of the first side surface 12e and a portion of the second side surface 12f. The second end surface external electrode 22 may be disposed on the first main surface 12a and the second main surface 12b of the laminated body 12. Further, it is preferable that the second end surface external electrode 22 covers the entire second end surface 12d of the laminated body 12, for example.

As shown in FIGS. 8A and 8C, a first internal electrode 17 is exposed at the first side surface 12e and the second side surface 12f of the laminated body 12 and electrically connected to the first end surface external electrode 20, and is not exposed at the first end surface 12c of the laminated body 12.

As shown in FIGS. 8B and 8C, a second internal electrode 19 is exposed at the first side surface 12e and the second side surface 12f of the laminated body 12 and electrically connected to the second end surface external electrode 22, and is not exposed at the second end surface 12d of the laminated body 12.

The first internal electrode 17 and the second internal electrode 19 face each other with the dielectric layer 14 located therebetween to define a capacitor.

Fifth Preferred Embodiment

A multilayer ceramic capacitor according to a fifth preferred embodiment of the present invention includes the first external electrode and the second external electrode on the surface of the laminated body, as in the fourth preferred embodiment. In the fifth preferred embodiment, the first internal electrode includes the first A internal electrode and the first B internal electrode, and the second internal electrode includes the second A internal electrode and the second B internal electrode.

Figure 9A:
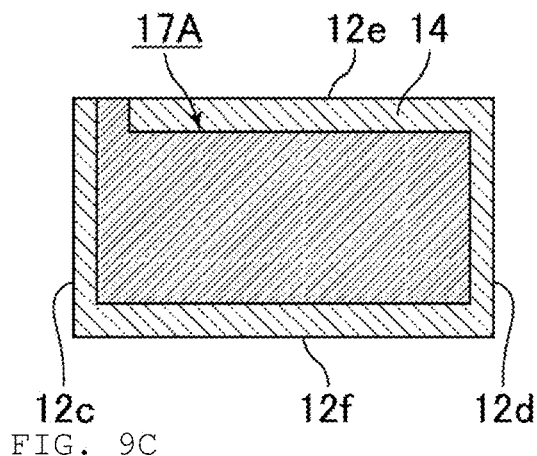
FIG. 9A is a plan view showing an example of the first A internal electrode of a multilayer ceramic capacitor according to a fifth preferred embodiment of the present invention.
Figure 9B:
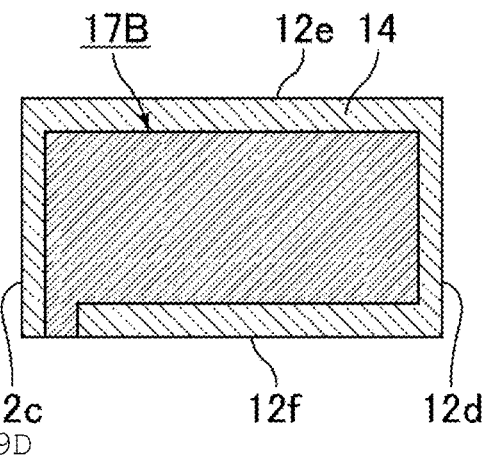
FIG. 9B is a plan view showing an example of the first B internal electrode of the multilayer ceramic capacitor according to the fifth preferred embodiment of the present invention.
Figure 9C:
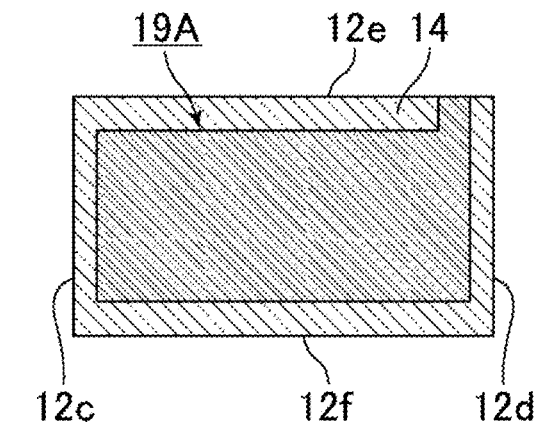
FIG. 9C is a plan view showing an example of the second A internal electrode of the multilayer ceramic capacitor according to the fifth preferred embodiment of the present invention.
Figure 9D:
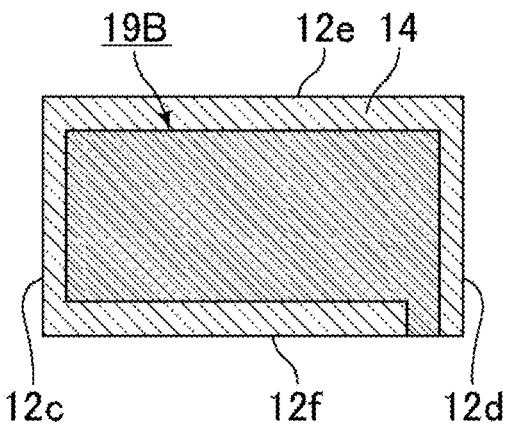
FIG. 9D is a plan view showing an example of the second B internal electrode of the multilayer ceramic capacitor according to the fifth preferred embodiment of the present invention.
Figure 9E:
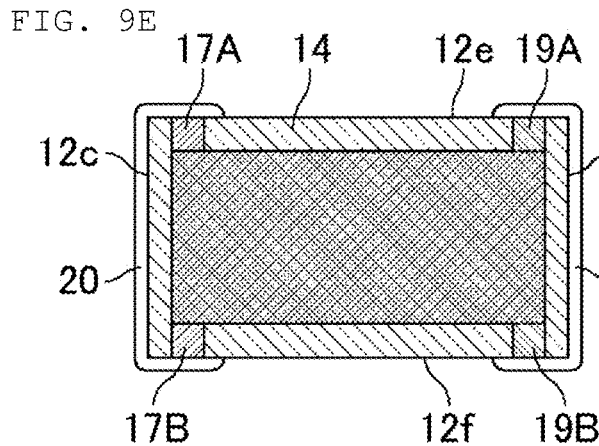
FIG. 9E is a perspective view of the multilayer ceramic capacitor, as viewed from the lamination direction in which the first A internal electrode shown in FIG. 9A, the first B internal electrode shown in FIG. 9B, the second A internal electrode shown in FIG. 9C, and the second B internal electrode shown in FIG. 9D are laminated.

FIG. 9A is a plan view showing an example of the first A internal electrode of a multilayer ceramic capacitor according to a fifth preferred embodiment of the present invention, FIG. 9B is a plan view showing an example of the first B internal electrode of the multilayer ceramic capacitor according to the fifth preferred embodiment of the present invention, FIG. 9C is a plan view showing an example of the second A internal electrode defining the multilayer ceramic capacitor according to the fifth preferred embodiment of the present invention, FIG. 9D is a plan view showing an example of the second B internal electrode of the multilayer ceramic capacitor according to the fifth preferred embodiment of the present invention, and FIG. 9E is a perspective view of the multilayer ceramic capacitor, as viewed from the lamination direction in which the first A internal electrode shown in FIG. 9A, the first B internal electrode shown in FIG. 9B, the second A internal electrode shown in FIG. 9C, and the second B internal electrode shown in FIG. 9D are laminated.

As shown in FIGS. 9A and 9E, a first A internal electrode 17A is exposed at the first side surface 12e of the laminated body 12 and electrically connected to the first end surface external electrode 20, and is not exposed at the first end surface 12c of the laminated body 12.

As shown in FIGS. 9B and 9E, a first B internal electrode 17B is exposed at the second side surface 12f of the laminated body 12 and electrically connected to the first end surface external electrode 20, and is not exposed at the first end surface 12c of the laminated body 12.

As shown in FIGS. 9C and 9E, a second A internal electrode 19A is exposed at the first side surface 12e of the laminated body 12 and electrically connected to the second end surface external electrode 22, and is not exposed at the second end surface 12d of the laminated body 12.

As shown in FIGS. 9D and 9E, a second B internal electrode 19B is exposed at the second side surface 12f of the laminated body 12 and electrically connected to the second end surface external electrode 22, and is not exposed at the second end surface 12d of the laminated body 12.

Any one of the first A internal electrode 17A and the first B internal electrode 17B, and any one of the second A internal electrode 19A and the second B internal electrode 19B face each other with the dielectric layer 14 located therebetween to define a capacitor.

Sixth Preferred Embodiment

A multilayer ceramic capacitor according to the sixth preferred embodiment of the present invention is a multi-terminal multilayer ceramic capacitor, and includes the first external electrode, the second external electrode, the third external electrode, the fourth external electrode, the fifth external electrode, and the sixth external electrode on the surface of the laminated body.

Figure 10A:
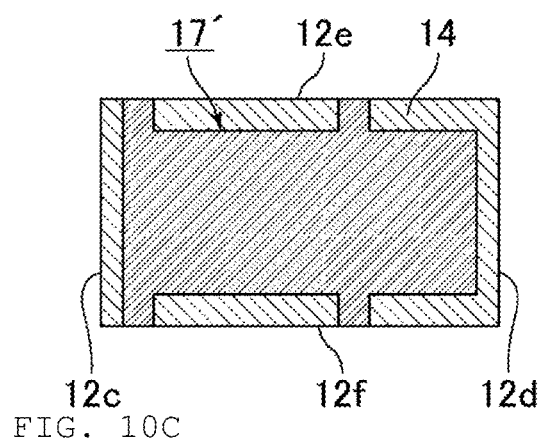
FIG. 10A is a plan view showing an example of a first internal electrode of the multilayer ceramic capacitor according to a sixth preferred embodiment of the present invention.
Figure 10B:
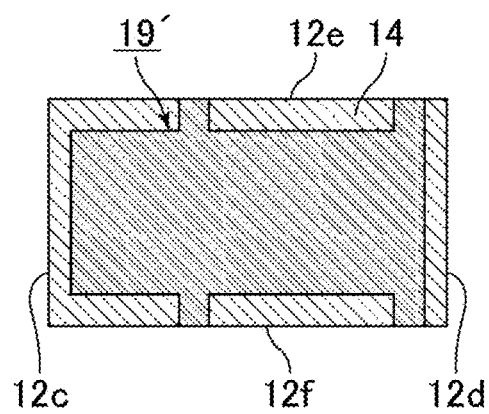
FIG. 10B is a plan view showing an example of a second internal electrode of the multilayer ceramic capacitor according to the sixth preferred embodiment of the present invention.
Figure 10C:
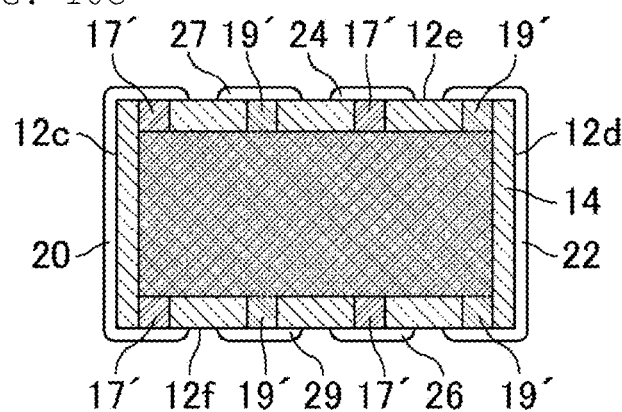
FIG. 10C is a perspective view of the multilayer ceramic capacitor, as viewed from the lamination direction in which the first internal electrode shown in FIG. 10A and the second internal electrode shown in FIG. 10B are laminated.

FIG. 10A is a plan view showing an example of the first internal electrode defining the multilayer ceramic capacitor according to the sixth preferred embodiment of the present invention. FIG. 10B is a plan view showing an example of the second internal electrode defining the multilayer ceramic capacitor according to the sixth preferred embodiment of the present invention. FIG. 10C is a perspective view of the multilayer ceramic capacitor, as viewed from the lamination direction in which the first internal electrode shown in FIG. 10A and the second internal electrode shown in FIG. 10B are laminated.

As shown in FIG. 10C, the first end surface external electrode 20, which is an example of the first external electrode, is disposed on the first end surface 12c of the laminated body 12. The first end surface external electrode 20 extends from the first end surface 12c of the laminated body 12 to cover a portion of the first side surface 12e and a portion of the second side surface 12f. The first end surface external electrode 20 may be disposed on the first main surface 12a and the second main surface 12b of the laminated body 12. Moreover, it is preferable that the first end surface external electrode 20 covers the entire or substantially the entire first end surface 12c of the laminated body 12, for example.

As shown in FIG. 10C, the second end surface external electrode 22, which is an example of the second external electrode, is disposed on the second end surface 12d of the laminated body 12. The second end surface external electrode 22 extends from the second end surface 12d of the laminated body 12 to cover a portion of the first side surface 12e and a portion of the second side surface 12f. The second end surface external electrode 22 may be disposed on the first main surface 12a and the second main surface 12b of the laminated body 12. Further, it is preferable that the second end surface external electrode 22 covers the entire or substantially the entire second end surface 12d of the laminated body 12, for example.

As shown in FIG. 10C, the first side surface external electrode 24, which is an example of the third external electrode, and a third side surface external electrode 27, which is an example of the fifth external electrode, are disposed on the first side surface 12e of the laminated body 12. The first side surface external electrode 24 and the third side surface external electrode 27 may extend from the first side surface 12e to cover a portion of the first main surface 12a and a portion of the second main surface 12b.

As shown in FIG. 10C, the second side surface external electrode 26, which is an example of the fourth external electrode, and a fourth side surface external electrode 29, which is an example of a sixth external electrode, are disposed on the second side surface 12f of the laminated body 12. The second side surface external electrode 26 and the fourth side surface external electrode 29 may extend from the second side surface 12f to cover a portion of the first main surface 12a and a portion of the second main surface 12b.

In addition, the first side surface external electrode 24 may extend from the first side surface 12e to the second side surface external electrode 26 and cover the first main surface 12a, and furthermore, the first side surface external electrode 24 may extend from the first side surface 12e to the second side surface external electrode 26 and cover the second main surface 12b, so that the first side surface external electrode 24 and the second side surface external electrode 26 may be connected. As a result of the connection, the first side surface external electrode 24 may wind around the laminated body 12.

Similarly, the third side surface external electrode 27 may extend from the first side surface 12e to the fourth side surface external electrode 29 and cover the first main surface 12a, and furthermore, the third side surface external electrode 27 may extend from the first side surface 12e to the fourth side surface external electrode 29 and cover the second main surface 12b, so that the third side surface external electrode 27 and the fourth side surface external electrode 29 may be connected. As a result of the connection, the third side surface external electrode 27 may be disposed to wind around the laminated body 12.

As shown in FIGS. 10A and 10C, a first internal electrode 17' is exposed at the first side surface 12e and the second side surface 12f of the laminated body 12 and electrically connected to the first end surface external electrode 20, and is not exposed at the first end surface 12c of the laminated body 12. The first internal electrode 17' is not exposed at the second end surface 12d of the laminated body 12, but is exposed at the first side surface 12e of the laminated body 12 and electrically connected to the first side surface external electrode 24, and is exposed at the second side surface 12f of the laminated body 12 and electrically connected to the second side surface external electrode 26.

As shown in FIGS. 10B and 10C, a second internal electrode 19' is exposed at the first side surface 12e and the second side surface 12f of the laminated body 12 and electrically connected to the second end surface external electrode 22, and is not exposed at the second end surface 12d of the laminated body 12. The second internal electrode 19' is not exposed at the first end surface 12c of the laminated body 12, but is exposed at the first side surface 12e of the laminated body 12 and electrically connected to the third side surface external electrode 27, and is exposed at the second side surface 12f of the laminated body 12 and electrically connected to the fourth side surface external electrode 29.

The first internal electrode 17' and the second internal electrode 19' face each other with the dielectric layer 14 located therebetween to define a capacitor.

Other Preferred Embodiments

The multilayer ceramic capacitor of the present invention is not limited to the above preferred embodiments, and various applications and modifications can be made within the scope of the present invention.

For example, when the first internal electrode includes the first A internal electrode and the first B internal electrode, the first A internal electrode may be disposed at a position different from that of the first B internal electrode in the lamination direction, or may be disposed at a position the same as or similar to that of the first B internal electrode in the lamination direction.

When the first A internal electrode is disposed at a position the same as or similar to that of the first B internal electrode in the lamination direction, the first A internal electrode and the first B internal electrode, etc. which are obtained by dividing the first internal electrode 16 shown in FIG. 4A at a position of about ½ of the length of the width direction (W direction) can be applicable.

The preferred embodiments of the present invention can also be applied to multilayer ceramic capacitors other than the three-terminal multilayer ceramic capacitor, the two-terminal multilayer ceramic capacitor, and the multi-terminal multilayer ceramic capacitor described above. Further, the multilayer ceramic capacitors according to the preferred embodiments of the present invention may be multilayer ceramic capacitors including a via electrode, multilayer ceramic capacitors including a bottom face electrode, or the like.

Method of Manufacturing Multilayer Ceramic Capacitor

Hereinafter, as a preferred embodiment of a method of manufacturing the multilayer ceramic capacitor of the present invention, an example in which the multilayer ceramic capacitor 10 shown in FIG. 1 is mass-produced will be described.

First, the ceramic green sheet to be the dielectric layer 14 is prepared. The ceramic green sheet includes a binder, a solvent, and the like in addition to the ceramic raw material including the dielectric material described above. The ceramic green sheet is formed, for example, on a carrier film using a die coater, a gravure coater, a microgravure coater, or the like.

An internal electrode pattern is formed on the ceramic green sheet by, for example, applying a conductive paste in a predetermined pattern on the ceramic green sheet. The conductive paste is applied onto the ceramic green sheet using, for example, a screen printing method, an inkjet method, a gravure printing method, or the like.

Figure 11:
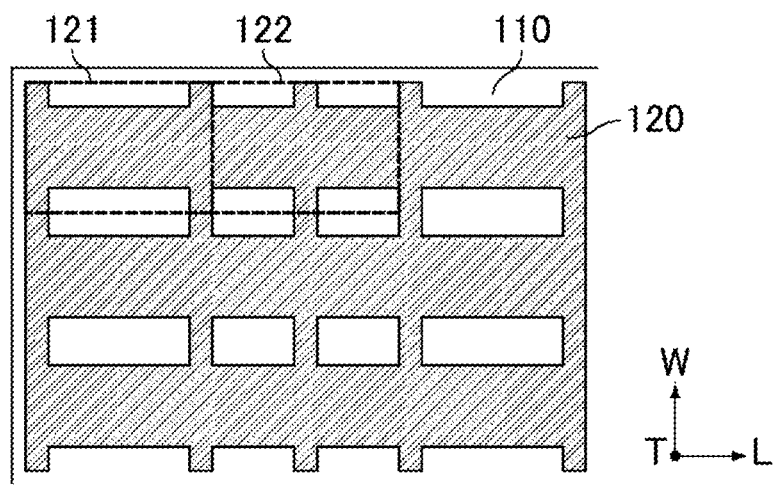
FIG. 11 is a plan view showing an example of a ceramic green sheet on which an internal electrode patterns is provided.

FIG. 11 is a plan view showing an example of a ceramic green sheet on which an internal electrode pattern is formed. As shown in FIG. 11, the conductive paste is applied in a predetermined pattern on the ceramic green sheet 110 to be the dielectric layer 14 to form an internal electrode pattern 120 to be the first internal electrode 16 and the second internal electrode 18.

In the internal electrode pattern 120, a first internal electrode region 121 to be the first internal electrode 16 and a second internal electrode region 122 to be the second internal electrode 18 are connected in the length direction (L direction) and is continuous along the width direction (W direction).

After that, the lamination process is performed in which a predetermined number of ceramic green sheets without the internal electrode pattern are laminated, on top of them, a predetermined number of ceramic green sheets with the internal electrode pattern are laminated while they are shifted, and on top of them, a predetermined number of ceramic green sheets without the internal electrode pattern are laminated.

Figure 12:
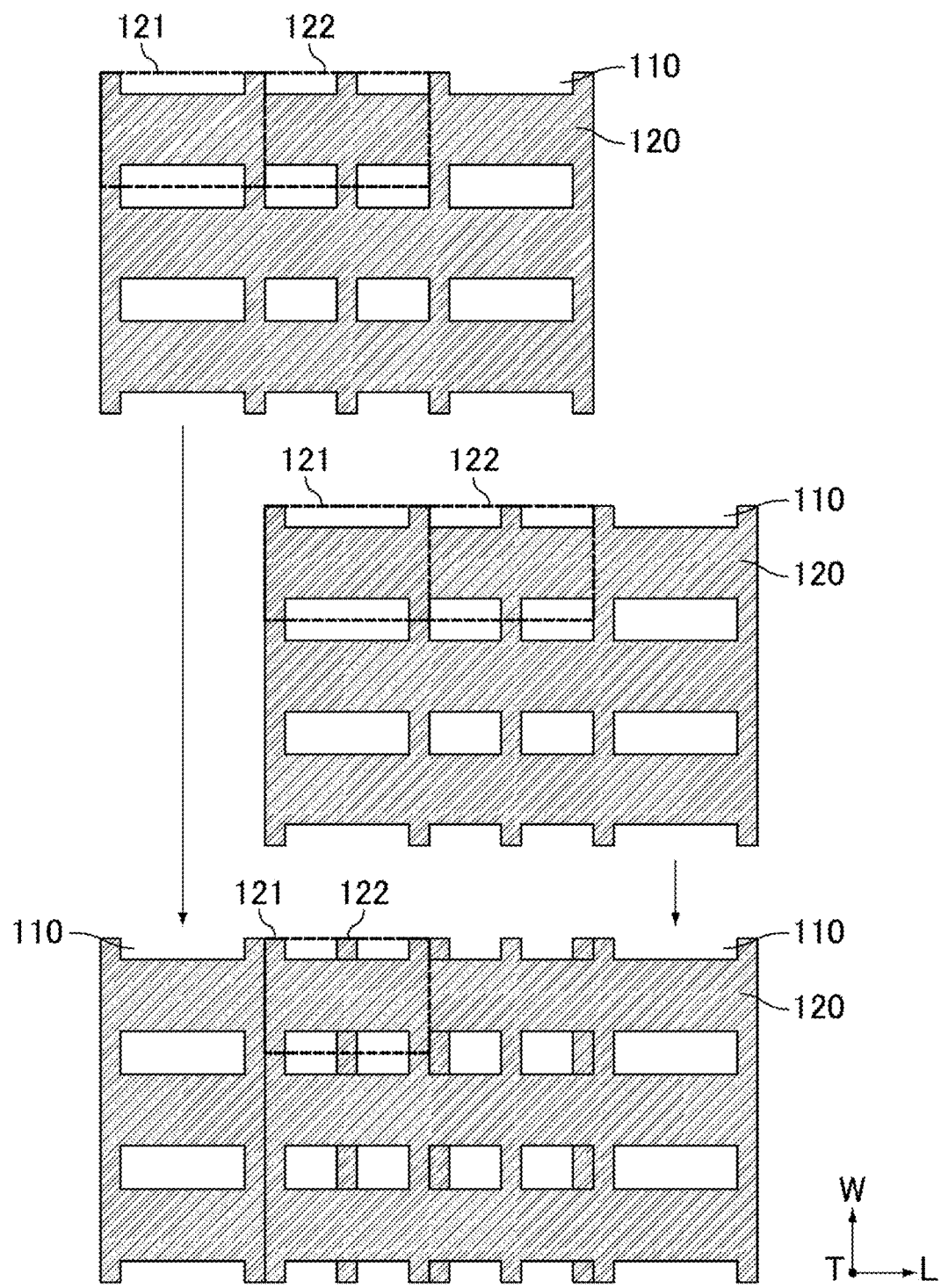
FIG. 12 is a plan view showing a method of laminating ceramic green sheets on which an internal electrode pattern is provided.

FIG. 12 is a plan view showing a method of laminating ceramic green sheets on which the internal electrode pattern is formed. As shown in FIG. 12, ceramic green sheets 110 are laminated while being shifted in the length direction (L direction) so that the first internal electrode region 121 and the second internal electrode region 122 formed on the ceramic green sheets 110 face each other in the lamination direction (T direction).

As a result of the lamination process, a laminated sheet which includes a plurality of laminated ceramic green sheets and internal electrode patterns disposed along a plurality of interfaces between the ceramic green sheets is obtained. The laminated sheet is pressed in the lamination direction by, for example, an isostatic press or the like.

A plurality of green chips are obtained by cutting the obtained laminated sheet along the width direction and the length direction orthogonal or substantially orthogonal to each other.

Figure 13:
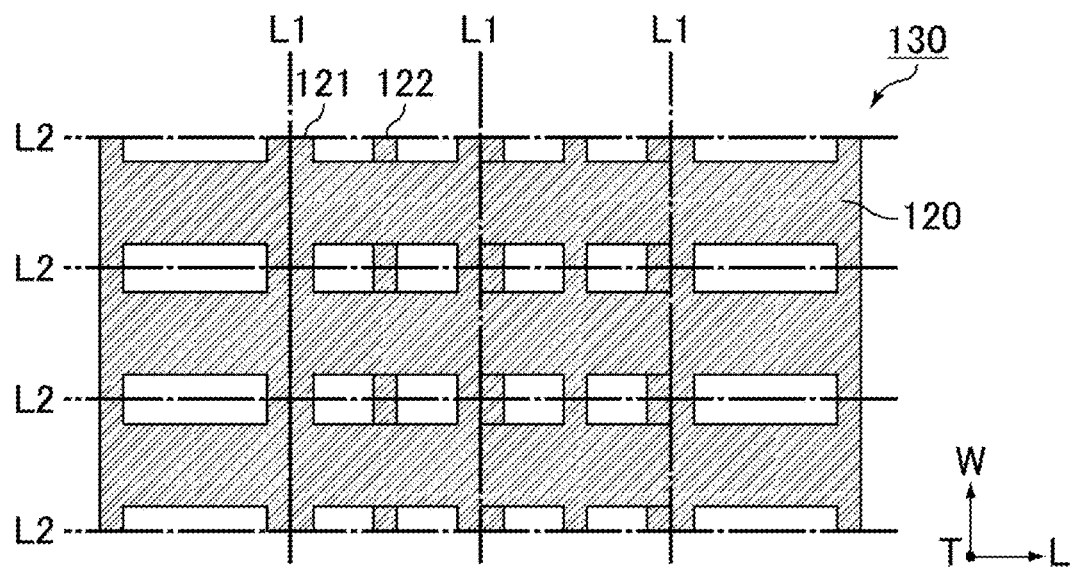
FIG. 13 is a plan view showing a method of cutting a laminated sheet.

FIG. 13 is a plan view showing the method of cutting the laminated sheet. As shown in FIG. 13, a laminated sheet 130 is cut along a cutting line L1 in the width direction (W direction) orthogonal or substantially orthogonal to the lamination direction (T direction) and along a cutting line L2 in the length direction (L direction) orthogonal or substantially orthogonal to the lamination direction (T direction) and the width direction (W direction). Thus, the first internal electrode region 121 and the second internal electrode region 122 of the internal electrode pattern 120 are divided.

Cutting of the laminated sheet can be performed, for example, by a cutting with a dicing machine, a hand push cutting, a laser cutting or the like.

Figure 14:
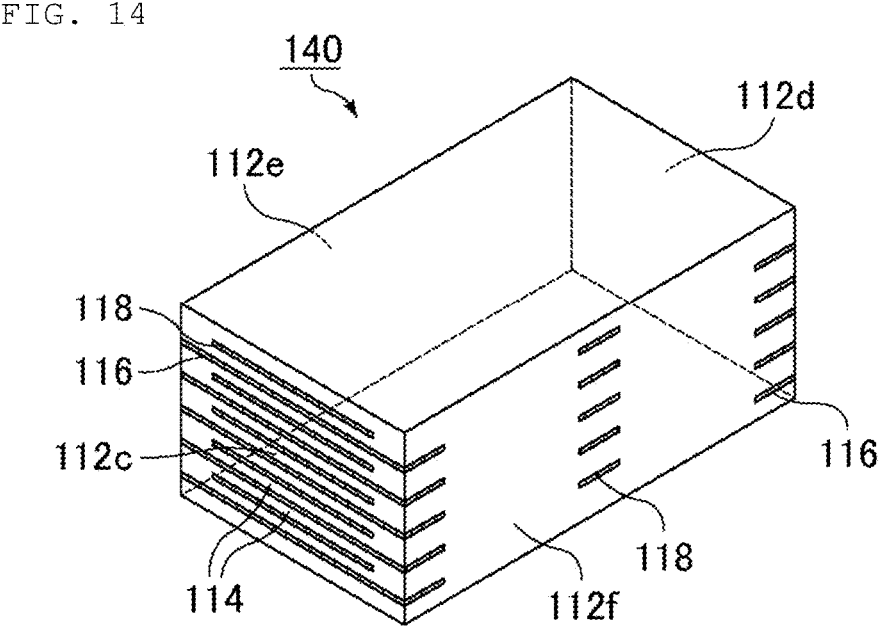
FIG. 14 is a perspective view showing an example of a green chip.

FIG. 14 is a perspective view showing an example of a green chip.

A green chip 140 shown in FIG. 14 has a laminated structure with a plurality of dielectric layers 114 in an unfired state and the plurality of internal electrodes 116 and 118. A first cut end surface 112c and a second cut end surface 112d of the green chip 140 are surfaces that appear by cutting along the cutting line L1 in the width direction (W direction), and a first cut side surface 112e and a second cut side surface 112f are surfaces that appear by cutting along the cutting line L2 in the length direction (L direction). The first internal electrode 116 and the second internal electrode 118 are exposed at the first cut end surface 112c. Although not shown, the first internal electrode 116 and the second internal electrode 118 are exposed at the second cut end surface 112d. At the second cut side surface 112f, two locations of the first internal electrode 116 in the same layer are exposed and, further, the second internal electrode 118 is exposed. Although not shown, at the first cut side surface 112e, two locations of the first internal electrode 116 in the same layer are exposed and, further, the second internal electrode 118 is exposed.

Subsequently, a first insulation layer is formed on a first cut end surface, and a second insulation layer is formed on a second cut end surface.

Figure 15A:
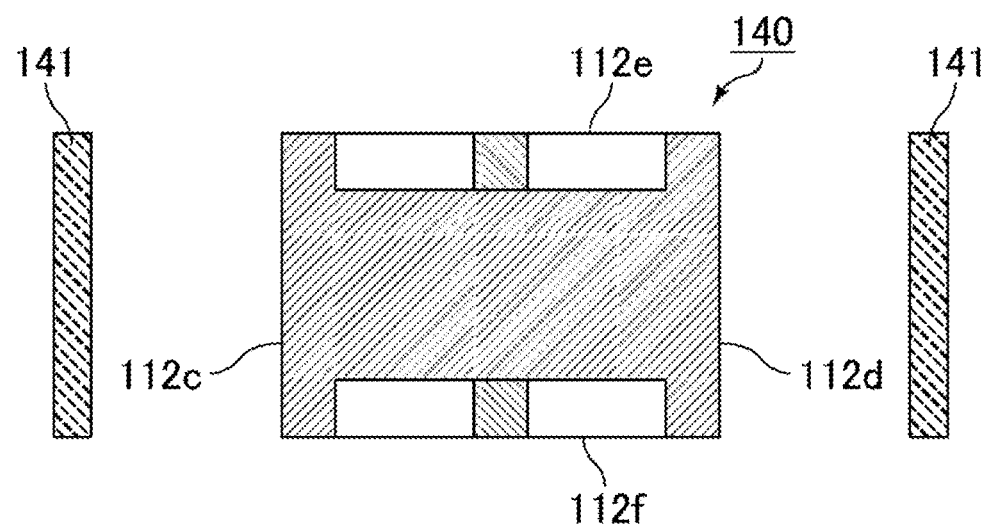
FIGS. 15A and 15B are views showing a process of forming an insulation layer on a cut end surface.
Figure 15B:
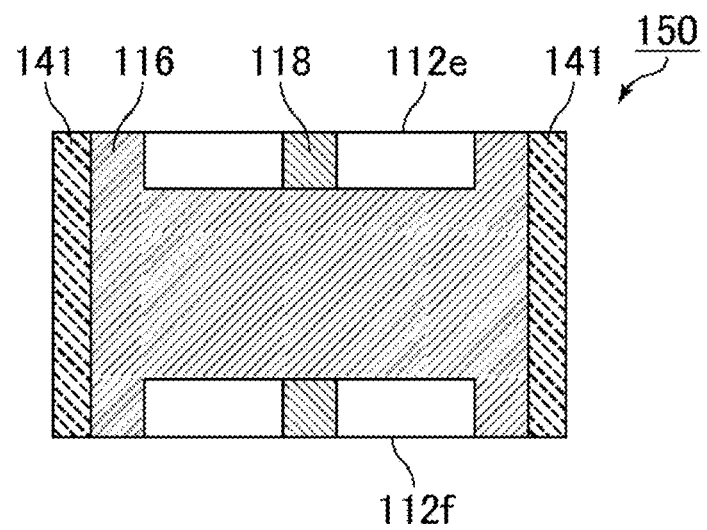

FIG. 15A and FIG. 15B are diagrams showing the process of forming an insulation layer on a cut end surface.

As shown in FIG. 15A, the insulation layer can be formed, for example, by attaching an insulating sheet 141 to the first cut end surface 112c and the second cut end surface 112d of the green chip 140. Thus, as shown in FIG. 15B, an unfired laminated body 150 in which the first internal electrode 116 and the second internal electrode 118 are exposed only at the first cut side surface 112e and the second cut side surface 112f is obtained.

The insulation layer, for example, the first insulation layer, is preferably formed by attaching an insulating sheet. In this case, an insulation layer with high uniformity of thickness can be formed. Note that an adhesive may be applied to the cut end surface before attaching the insulating sheet. This adhesive is removed by burning off in a later firing process.

Alternatively, the insulation layer, for example, the first insulation layer, may be formed by applying and drying an insulating paste.

It is preferable that the ceramic raw material of the ceramic green sheet to produce a laminated sheet is included in the insulating sheet or the insulating paste as a main component, for example.

In addition, it is preferable to perform appropriately barrel polishing or the like on the unfired laminated body, and to round the corner portion and the ridgeline portion, for example.

Next, the unfired laminated body 150 is fired to obtain the laminated body 12 shown in FIGS. 1, 2 and 3.

The firing temperature can be appropriately set depending on the used ceramic material and conductive material, and is preferably, for example, about 900° C. or more and about 1300° C. or less. The ceramic green sheet and the internal electrode conductive paste are simultaneously fired.

After that, the conductive paste is applied to the first end surface 12c of the laminated body 12 and fired to form the base electrode layer 28 of the first end surface external electrode 20. The conductive paste is applied to the second end surface 12d and fired to form the base electrode layer 32 of the second end surface external electrode 22. In addition, the conductive paste is applied to the first side surface 12e of the laminated body 12 and fired to form the base electrode layer 36 of the first side surface external electrode 24. The conductive paste is applied to the second side surface 12f and fired to form the base electrode layer 40 of the second side surface external electrode 26. The baking temperature is preferably about 700° C. or more and about 900° C. or less, for example.

Next, the plating layer 30 is formed on the surface of the base electrode layer 28 of the first end surface external electrode 20, and the plating layer 34 is formed on the surface of the base electrode layer 32 of the second end surface external electrode 22. Also, the plating layer 38 is formed on the surface of the base electrode layer 36 of the first side surface external electrode 24, and the plating layer 42 is formed on the surface of the base electrode layer 40 of the second side surface external electrode 26.

In this way, the multilayer ceramic capacitor 10 shown in FIG. 1 is manufactured.

In the above-described preferred embodiment, a laminated sheet 130 is cut along the cutting lines L1 and L2 to obtain a plurality of green chips, and then the insulation layers are formed on both end surfaces of the green chip, but the order in which the laminated sheet is formed and the order in which the insulation layer is formed are not particularly limited.

For example, after obtaining a plurality of rod-shaped green block bodies in which the first internal electrode and the second internal electrode are exposed at the cut end surface by cutting the laminated sheet 130 along only the cutting line L1, the insulation layers are formed on both end surfaces of the green block bodies. After that, the green block bodies are cut along the cutting line L2 to obtain a plurality of unfired laminated bodies, and then, the unfired laminated bodies may be fired. After firing, the multilayer ceramic capacitor 10 shown in FIG. 1 can be manufactured by forming the external electrodes in the same or similar manner as in the above-described preferred embodiment.

A multilayer ceramic capacitor other than the multilayer ceramic capacitor 10 shown in FIG. 1 can be manufactured by appropriately changing the position and the number of the first internal electrodes and the second internal electrodes exposed by cutting the laminated sheet, and the position and the number of the external electrodes.

Examples

Hereinafter, examples are provided in which multilayer ceramic capacitors according to the preferred embodiments of the present invention are disclosed more specifically. The present invention is not limited to only the examples provided below.

Multilayer ceramic capacitors of an Example 1 of a preferred embodiment of the present invention, a Comparative Example 1, and a Comparative Example 2 having the following configuration were produced.

Figure 16A:
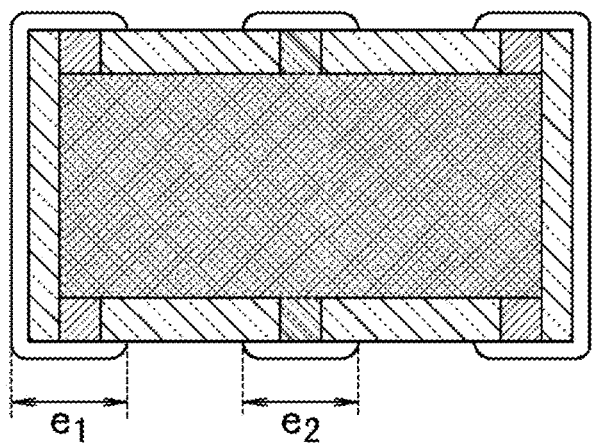
FIG. 16A is a perspective view of the multilayer ceramic capacitor of Example 1 as viewed from the lamination direction.
Figure 16B:
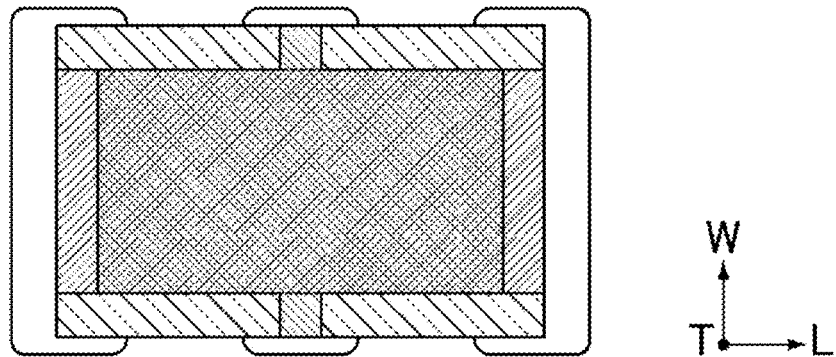
FIG. 16B is a perspective view of the multilayer ceramic capacitors of Comparative Example 1 and Comparative Example 2 as viewed from the lamination direction.
Figure 17A:
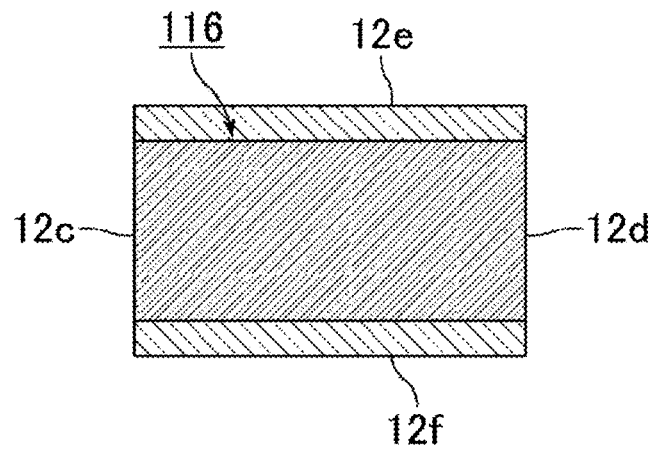
FIG. 17A is a plan view showing an example of a first internal electrode of a conventional multilayer ceramic capacitor.
Figure 17B:
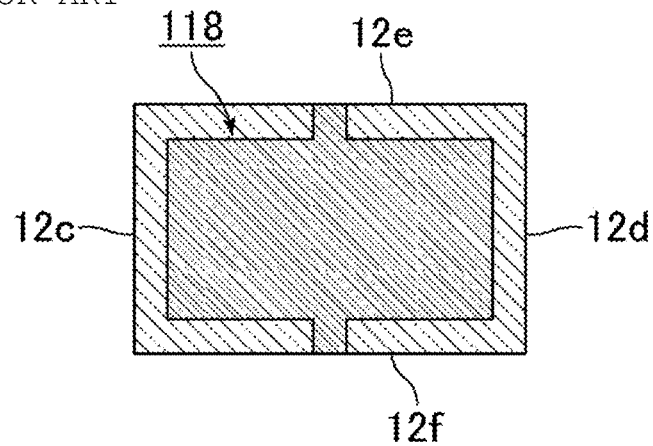
FIG. 17B is a plan view showing an example of a second internal electrode of the conventional multilayer ceramic capacitor.
Figure 17C:
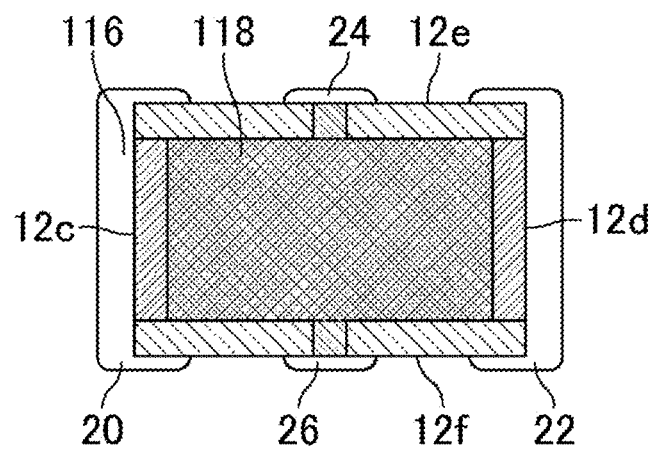
FIG. 17C is a perspective view of the multilayer ceramic capacitor, as viewed from the lamination direction in which the first internal electrode shown in FIG. 17A and the second internal electrode shown in FIG. 17B are laminated.

FIG. 16A is a perspective view of the multilayer ceramic capacitor of Example 1 as viewed from the lamination direction, and FIG. 16B is a perspective view of the multilayer ceramic capacitors of Comparative Example 1 and Comparative Example 2 as viewed from the lamination direction.

Dimension of end surface external electrode folded portion (length indicated by $e_1$ in FIG. 16A): about 200 μm
Width of side surface external electrode (length indicated by $e_2$ in FIG. 16A): about 300 μm
External dimensions (L×W×T)
   Example 1 and Comparative Example 1: about 1.13 mm×about 0.63 mm×about 0.63 mm
   Comparative Example 2: about 1.12 mm×about 0.63 mm×about 0.63 mm
Laminated body dimensions (L×W×T)
   Example 1: about 1.07 mm×about 0.56 mm×about 0.60 mm
   Comparative Example 1 and Comparative Example 2: about 1.06 mm×about 0.56 mm×about 0.60 mm
Main component of dielectric layer: barium titanate
Average thickness of dielectric layer: about 0.59 μm
Main component of internal electrode: Ni
Average thickness of internal electrode: about 0.5 μm
The number of internal electrodes laminated: 533
Width of extended electrode portion to side surface: about 110 μm
W gap: about 40 μm
Firing conditions: Firing at a top temperature of about 1200° C. in a reducing atmosphere
External electrode: Structure including base electrode layer (baked layer) and plating layer
Base electrode layer: Cu baked electrode (baked at about 800° C.)
Plating layer: Two-layer structure of Sn-plating after Ni plating Method of Forming External Electrode After an external electrode paste is applied to three locations of the first side surface and three locations of the second side surface of the laminated body by roller coating, the laminated body is dried.

Thereafter, a first time dip coating is performed on one end surface of the laminated body using the external electrode paste.

At this time, an external electrode folded portion is formed on the first side surface and the second side surface, and simultaneously on the first main surface and the second main surface. In the first time dip coating, drying of the external electrode paste is not performed.

A second time dip coating is performed to adjust the thickness of the external electrode, and the external electrode paste is dried.

At this time, the external electrode paste on the end surface applied at the first time is scraped off and the thickness is adjusted. The first time dip coating and the second time dip coating are similarly performed on the other end surface of the laminated body.

After baking the external electrode paste, a plating layer is formed.

Alternatively, the external electrode may be formed by the following method.

In order to form the first and second side surface external electrodes, the external electrode paste is applied onto one location of the first side surface and one location of the second side surface of the laminated body and then the laminated body is dried.

Thereafter, a first time dip coating is performed on one end surface of the laminated body using the external electrode paste.

At this time, external electrode folded portions on the first and second main surfaces and the first and second side surfaces are simultaneously formed. In the first time dip coating, drying of the external electrode paste is not performed.

A second time dip coating is performed to adjust the thickness of the external electrode, and the external electrode paste is dried.

At this time, the external electrode paste on the end surface applied at the first time is scraped off and the thickness is adjusted.

The first time dip coating and the second time dip coating are similarly performed on the other end surface of the laminated body. After baking the external electrode paste, a plating layer is formed.

In the structure of Example 1, since the two extended electrode portions are combined into one end surface external electrode, the wiring pattern on the mounting substrate can be simplified. Moreover, the external shape of Example 1 can be made the same or substantially the same as that of Comparative Example 1, which is a conventional structural product. Therefore, the wiring pattern on the mounting substrate used in the conventional structural product can be used with almost no change.

Table 1 shows the thickness of the Cu baked electrode in the length direction (L direction), and the L gap of the laminated body.

In Example 1, according to the above-described manufacturing method, the L gap is narrowed by attaching a dielectric sheet which is an insulating sheet to form an end surface portion. The thicknesses of the Cu baked electrodes of the end surface external electrodes in the length direction in Example 1 and Comparative Example 2 were thinner than that in Comparative Example 1.

TABLE 1

| | Example 1 | Comparative Example 1 | Comparative Example 2 |
|---|---|---|---|
| Thickness of Cu baked electrode in length direction | 20 μm | 25 μm | 20 μm |
| L gap of laminated body | 16 μm | 50 μm (L gap of second internal electrode) | |

For each structure, the average value of capacitance for 20 samples and the average value of equivalent series inductance (ESL) for 5 samples were measured. The results of Example 1 and Comparative Example 1 are shown in Table 2.

TABLE 2

| | Example 1 | Comparative Example 1 |
|---|---|---|
| Capacitance (1 kHz, 0.5 V) | 16.75 μF | 15.45 μF |
| ESL (1 GHz) | 38 pH | 43 pH |

In Example 1, the effective area can be increased by making the thickness of the Cu baked electrode in the length direction and the L gap of the laminated body smaller than those in Comparative Example 1, and a high capacitance can be obtained.

In addition, it is presumed that the loop inductance is reduced due to the smaller distance between the first internal electrode (through electrode) and the second internal electrode (ground electrode). The ESL of Example 1 was lower than that of Comparative Example 1.

The moisture resistance load test was performed using 72 samples for each structure.

The moisture resistance load test was performed under the conditions of a temperature of about 85° C., a humidity of about 85%, and an applied voltage of about 4V, and the insulation resistance IR (Ω) after about 1000 hours was measured. The sample in which Log IR≤6 was determined as failure.

A total of 72 tests of applying the voltage were performed where 36 tests were performed for each of the two directions when the first internal electrode (through electrode) is set to positive (positive application) and when the second internal electrode (ground electrode) is set to positive (reverse application). The number of failures is shown in Table 3.

TABLE 3

| Moisture resistance load test | Example 1 | Comparative Example 1 | Comparative Example 2 |
| --- | --- | --- | --- |
| Positive application | 0/36 | 0/36 | 2/36 |
| Reverse application | 0/36 | 0/36 | 0/36 |

In Example 1, the entry of water is significantly reduced or prevented even when the end surface external electrode is thinned by exposing the first and second extended electrode portions at the side surfaces, so that no failure occurs, and it is presumed that Example 1 has the moisture resistance load reliability equivalent or substantially equivalent to that of Comparative Example 1.

On the other hand, in Comparative Example 2, it is presumed that the amount of water reaching the first internal electrode (through electrode) increases due to the thinning of the end surface external electrode, and the moisture resistance load reliability is deteriorated.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a laminated body including a plurality of dielectric layers and a plurality of internal electrodes that are alternately laminated, the laminated body including a first main surface and a second main surface facing each other in a lamination direction, a first end surface and a second end surface facing each other in a length direction orthogonal or substantially orthogonal to the lamination direction, and a first side surface and a second side surface facing each other in a width direction orthogonal or substantially orthogonal to the lamination direction and the length direction; and
a first external electrode and a second external electrode provided on a surface of the laminated body; wherein
the first external electrode is provided on the first end surface of the laminated body, and extends from the first end surface of the laminated body to cover a portion of the first side surface and a portion of the second side surface;
the plurality of internal electrodes include a first internal electrode electrically connected to the first external electrode and a second internal electrode facing the first internal electrode in the lamination direction and electrically connected to the second external electrode;
the first internal electrode is exposed at the first side surface and the second side surface of the laminated body and electrically connected to the first external electrode, and is not exposed at the first end surface of the laminated body; and
a length of a gap between an end of the first internal electrode and the first end surface of the laminated body in the length direction is in a range from about 5 μm to about 50 μm.

2. The multilayer ceramic capacitor according to claim 1, wherein an end portion of the second internal electrode on a first end surface side is located at a position overlapping an end portion of the first internal electrode on a first end surface side as viewed from the lamination direction.

3. The multilayer ceramic capacitor according to claim 1, wherein an end portion of the second internal electrode on a second end surface side is located at a position overlapping an end portion of the first internal electrode on a second end surface side as viewed from the lamination direction.

4. The multilayer ceramic capacitor according to claim 1, wherein the first external electrode entirely or substantially entirely covers the first end surface of the laminated body.

5. The multilayer ceramic capacitor according to claim 1, further comprising:
a third external electrode and a fourth external electrode provided on the surface of the laminated body; wherein
the third external electrode is provided on the second end surface of the laminated body, and extends from the second end surface of the laminated body to cover a portion of the first side surface and a portion of the second side surface;
the first internal electrode is exposed at the first side surface and the second side surface of the laminated body and electrically connected to the third external electrode, and is not exposed at the second end surface of the laminated body; and
the second internal electrode is exposed at the first side surface of the laminated body and electrically connected to the second external electrode, and is exposed at the second side surface of the laminated body and electrically connected to the fourth external electrode.

6. The multilayer ceramic capacitor according to claim 5, wherein the third external or substantially entirely electrode entirely covers the second end surface of the laminated body.

7. The multilayer ceramic capacitor according to claim 5, wherein the fourth external electrode extends from the second side surface to cover a portion of the first main surface and a portion of the second main surface.

8. The multilayer ceramic capacitor according to claim 1, wherein
the first internal electrode includes a first A internal electrode and a first B internal electrode;
the first A internal electrode is exposed at the first side surface of the laminated body and electrically connected to the first external electrode, and is not exposed at the first end surface of the laminated body; and
the first B internal electrode is exposed at the second side surface of the laminated body and electrically connected to the first external electrode, and is not exposed at the first end surface of the laminated body.

9. The multilayer ceramic capacitor according to claim 8, wherein the first A internal electrode is located at a different position in the lamination direction from a position of the first B internal electrode.

10. The multilayer ceramic capacitor according to claim 1, wherein the second external electrode extends from the first side surface to cover a portion of the first main surface and a portion of the second main surface.

11. The multilayer ceramic capacitor according to claim 1, wherein the first internal electrode includes a first counter electrode portion that faces the second internal electrode, a first extended electrode portion extended from the first counter electrode portion to the first side surface of the laminated body, a second extended electrode portion extended from the first counter electrode portion to the second side surface of the laminated body, a third extended electrode portion extended from the first counter electrode portion to the first side surface of the laminated body, and a fourth extended electrode portion extended from the first counter electrode portion to the second side surface of the laminated body.

12. The multilayer ceramic capacitor according to claim 11, wherein the first extended electrode portion is exposed at the first side surface of the laminated body and electrically connected to the first end surface external electrode, the second extended electrode portion is exposed at the second side surface of the laminated body and electrically connected to the first end surface external electrode, the third extended electrode portion is exposed at the first side surface of the laminated body and electrically connected to the second end surface external electrode, and the fourth extended electrode portion is exposed at the second side surface of the laminated body and electrically connected to the second end surface external electrode.

13. The multilayer ceramic capacitor according to claim 11, wherein the second internal electrode is substantially cross-shaped, and includes a second counter electrode portion facing the first internal electrode, a fifth extended electrode portion extended from the second counter electrode portion to the first side surface of the laminated body, and a sixth extended electrode portion extended from the second counter electrode portion to the second side surface of the laminated body.

14. The multilayer ceramic capacitor according to claim 1, wherein the length of the gap between the end of the first internal electrode and the first end surface of the laminated body in the length direction is about 10 μm to about 30 μm.

15. The multilayer ceramic capacitor according to claim 1, wherein the length of the gap between the end of the first internal electrode and the first end surface of the laminated body in the length direction is about 15 μm to about 20 μm.

* * * * *